United States Patent
Frey

(10) Patent No.: US 11,182,325 B1
(45) Date of Patent: Nov. 23, 2021

(54) MEMORY CENTRIC COMPUTING STORAGE CONTROLLER SYSTEM

(71) Applicant: SMART Modular Technologies, Inc., Newark, CA (US)

(72) Inventor: Robert Tower Frey, Fremont, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 0 days.

(21) Appl. No.: 16/889,727

(22) Filed: Jun. 1, 2020

(51) Int. Cl.
*G06F 13/40* (2006.01)
*G06F 13/16* (2006.01)

(52) U.S. Cl.
CPC ...... *G06F 13/4027* (2013.01); *G06F 13/1668* (2013.01)

(58) Field of Classification Search
None
See application file for complete search history.

(56) References Cited

U.S. PATENT DOCUMENTS

| | | | | |
|---|---|---|---|---|
| 6,167,051 A * | 12/2000 | Nagami | ............... | H04L 12/1886 370/395.2 |
| 8,422,360 B2 * | 4/2013 | Shimizu | ............... | H04L 45/00 370/218 |
| 9,152,748 B2 * | 10/2015 | Zievers | ............... | G06F 11/1458 |
| 9,479,431 B1 * | 10/2016 | Bratt | ............... | G06F 12/00 |
| 2008/0049637 A1 * | 2/2008 | Morrill | ............... | H04L 65/1069 370/252 |
| 2008/0052394 A1 * | 2/2008 | Bugenhagen | ............... | H04L 45/22 709/224 |
| 2012/0321052 A1 * | 12/2012 | Morrill | ............... | H04L 67/18 379/32.01 |

* cited by examiner

*Primary Examiner* — Michael Sun
(74) *Attorney, Agent, or Firm* — Withrow & Terranova, P.L.L.C.

(57) ABSTRACT

A deaggregated computing system having a memory centric computing storage controller can transfer data from a source to a destination node while dynamically updating a transfer route between them. The transfer route can be recalculated based on the current conditions of the routing nodes between the source and destination. Recalculating the transfer route can be based on power status, bandwidth, in-use status, current capacity, or failure conditions. The deaggregated computing system can include one or more processor units coupled to one or more storage and memory units all connected by the memory centric computing storage controller that can route control and data packets between the processor units and the storage and memory units. The processor units and the storage units can be connected by a combination of serial data communication links and a data storage fabric network.

17 Claims, 10 Drawing Sheets

MEMORY CENTRIC COMPUTING STORAGE CONTROLLER SYSTEM

TECHNICAL FIELD

Embodiments relate generally to computer systems, and, more specifically, to a computer system with a memory centric computing storage controller.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Modern high-speed computing involves certain operations of computer system that are performed by transferring data elements from a data storage sub-system and into main memory for processing by one or more processors. The data can vary between individual scaler values and large data arrays having very large numbers of individual elements. As compute systems increase in data capacity and computer power, larger volumes of data need to be processed in a given unit of time.

Computer system data can be retained for short or long periods of time. Dynamic and intermediate data can have a lifespan of nanoseconds, while stored data may be maintained for many years. Each type of data has individualized data access, storage, and preservation requirements that vary based on the purpose of the data.

Computer data centers also grow to accommodate the increasing amount of computer and networking equipment. Modern data centers consume large amounts of electrical power for the operation of the computer equipment and for the environmental cooling required to cool the equipment.

The requirements of fast and secure computer systems and their associated data and storage systems are constantly evolving. These computer systems must constantly evolve to accommodate the ever increase needs of modern computing applications. Computing power, local memory speed, storage capacity, data transfer rates, and power requirements grow without limit and require innovative solutions to satisfy the demands of modern computer systems.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
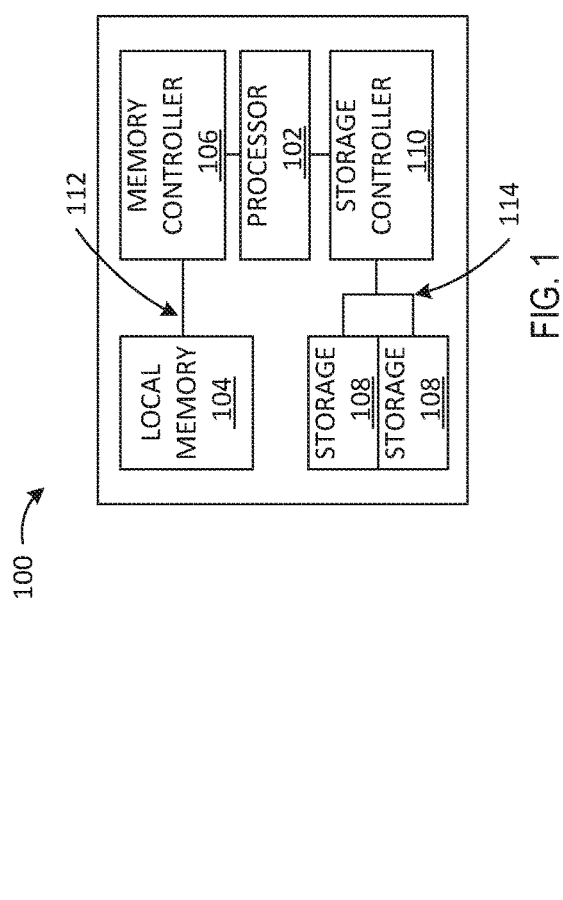
FIG. 1 depicts a view of a computer system in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview
2.0. Structural Overview
3.0. Implementation Mechanism-Hardware Overview
3.1. Link Interface
3.2. Protocol Engine
3.3. Configuration Manager
3.4. Storage Fabric Module
3.5. Power Management Unit
4.0. Functional Overview
5.0. Example Embodiments
6.0. Extensions and Alternatives 1.0. General Overview Approaches, techniques, and mechanisms are disclosed for manufacturing and operating a computer system with a memory-centric storage controller. The computer system with the memory-centric storage controller can store and retrieve data from a variety of memory elements. The system can be dynamically reconfigured to increase performance and capacity.

The deaggregated computing system can include single and multi-processor computer elements having different configurations of memory units and storage units all coupled together with a memory centric computing storage controller implementing a routing network fabric. The deaggregated computing system can be optimized for power consumption, speed, connectivity, redundancy, and memory capacity.

According to one embodiment, the system can comprise one or more processor elements coupled to one or more storage or memory units coupled by a memory centric computing storage controller having one or more element rows of a routing fabric. The processor units can transfer data between the processor units and the storage and memory units. The element rows are sets of components that perform computing, routing, networking, communication, and power management tasks. The system can transfer information by sending control and data packets from the processor units to the memory and storage units.

According to another embodiment, the system can include power management units on the components to manage the power consumption of each of the components and sub-components. The system can include link interfaces for managing the communication links used to transfer the control and data packets. The power management units can deactivate the link interfaces that are not being used to transfer packets to reduce power consumption and reactivate the link interfaces when the additional functionality is needed.

According to another embodiment, the system can comprise one or more processor units coupled to one or more storage units or memory units coupled by a memory centric computing storage controller implemented using a fabric switch. The fabric switch can form a communication network for routing the control and data packets using a variety of switching architectures. The fabric switch can implement grid network, a store and forward network, a crossbar network, a butterfly network, a broadcast network, a ring-based network, a bus network, or similar network configuration that supports the routing of the inputs to the output of the network.

According to another embodiment, the system can include power management units on the components to manage the power consumption of each of the components and subcomponents. The power management units can deactivate candidate components of the system to reduce the power consumption and then reactivate the candidate components when a target activity is detected.

Different types of computing including non-Von Neumann computing methods are being employed to solve different problems in combination with tradition Von Neumann types of computing. In order to collaborate these computing methods may use shared memory or memory centric storage systems.

In other aspects, the invention encompasses computer apparatuses and computer-readable media configured to carry out the foregoing techniques.

2.0. Structural Overview

FIG. 1 illustrates a view of a single computer system 100 in an embodiment. The single computer system 100 shows a traditional computer model having a processor 102 coupled to local memory 104 via a memory controller 106. The processor 102 can be coupled to storage unit 108 via a storage controller 110. The processor 102 can perform operations on the data elements stored in the local memory 104. The data elements can be transferred from the storage units 108 to the local memory 104 for processing.

The processor 102 can have a variety of configurations. For example, the processor 102 can be a central processing unit, a controller, a graphical processing unit, a microcontroller, a state machine, a dedicated hardware module, a field programmable gate array, an application specific integrated circuit, or a similar device. The processor 102 can include internal scratch pad memory areas and registers for performing operations and intermediate operations on the data elements.

The processor 102 can access the local memory 104 by directly controlling the memory controller 106 to access individual memory locations in the local memory 104. The memory controller 106 can transfer the data elements in the local memory 104 to the processor 102 as needed or on demand. For example, the local memory 104 can be dynamic random-access memory (DRAM), static random-access memory (SRAM), dual inline memory modules (DIMM), or other volatile memory devices.

The memory controller 106 is coupled to the processor 102 by a memory bus 112. The memory bus 112 can be characterized by a memory throughput or memory transfer rate. The memory throughput can be limited based on the speed of the local memory 104 and the physical data carrying capacity of the memory controller 106. The memory throughput can be dependent on the internal data path size, clock speed, architecture, and other factors.

The processor 102 can access the storage units 108 by controlling the storage controller 110. The storage controller 110 can transfer the data elements in the storage units 108 to the processor 102. The processor 102 can transfer the data elements to the local memory 104 using the memory controller 106. The storage units 108 can be implemented in a variety of ways. For example, the storage units 108 can be hard drives, solid-state storage units, Flash memory, resistive memory, phase change memory, spin transfer torque memory, optical memory, or other similar non-volatile memory.

The storage controller 110 is coupled to the processor 102 by a storage bus 114. The storage bus 114 can be characterized by a data throughput or data transfer rate. The data throughput can be limited based on the speed of the storage units 108, the speed and capacity of the storage bus 114, and the ability of the processor 102 to accept data. The data throughput can be dependent on the data path size, clock speed, architecture, and other factors.

The processor 102 can access the local memory 104 and storage units 108 in a variety of ways. For example, the processor 102 can access the local memory 104 using a byte or word address. The processor 102 can also access the storage units 108 using a logical block address. Alternatively, the processor can access the storage units 108 using a byte or word address where the byte address can be translated into a logical block address by the storage controller 110.

The single computer system 100 can access local memory and storage efficiently but accessing remote memory and storage can require additional steps that can reduce efficiency. Determining the location and status of remote data can require additional time to identify, query, and retrieve such data. In addition, the single computer system 100 operates at a higher level of granularity and requires additional effort to acquire additional resources and the computing and memory demands change over time.

Further, the single computer system 100 generally requires all components to be active to operate. Because of the lack of redundancy of components, the single computer system 100 can be limited in the ability to reduce power consumption by deactivating elements.

Figure 2:
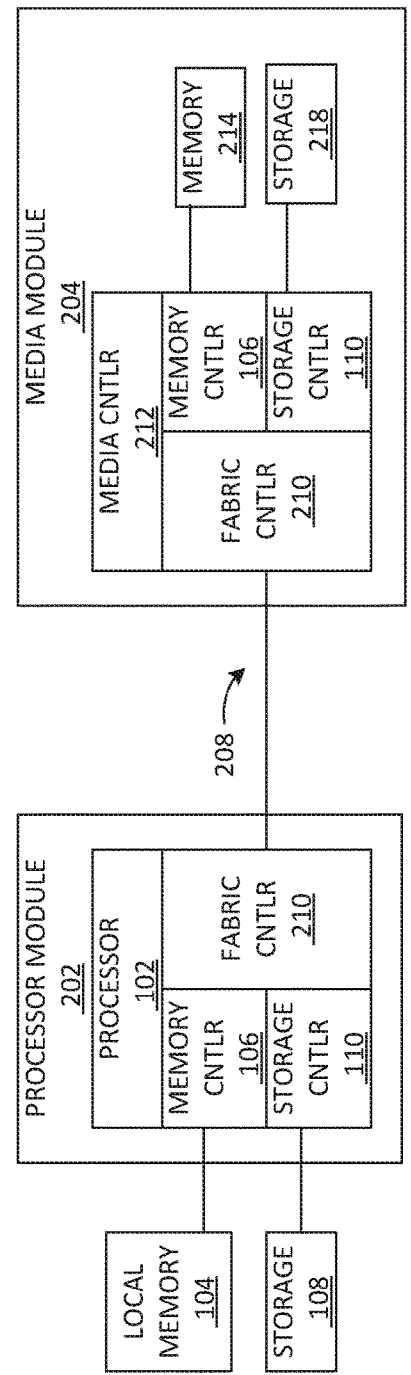
FIG. 2 depicts an illustrative example of a deaggregated computing system, according to a further embodiment.

FIG. 2 illustrates an example of a deaggregated computing system 200 in further embodiment. The deaggregated computing system 200 can provide a more efficient computing model by inherently supporting a redundant component architecture. This provides the deaggregated computing system 200 with a greater degree of flexibility in terms of allocating and utilizing the computing, storage, communication, and power resources of the system.

The deaggregated computing system 200 can includes a processor module 202 coupled to a media module 204 via a memory access interconnection 208. The media module 204 can be configured to provide processing, memory, storage, and other services.

The processor module 202 is a computing element for processing the data elements with the local memory 104 and the storage units 218. Although the processor module 202 is shown as a single unit, it is understood that the deaggregated computing system 200 can have one or more processor modules 202.

The processor module 202 can have a variety of configurations. For example, the processor module 202 can include the processor 102 coupled to the memory controller 106 and the storage controller 110 for interfacing with the local memory 104 and the storage units 218, respectively. The processor module 202 can have similar components as the single computer system 100.

The memory controller 106 is an interface device for local memory functionality. The memory controller 106 can perform a variety of functions. This can include initiating high-level commands such as reads and writes, enforce ordering and timing, perform path selection, translate addresses, handle external requests, cache memory requests, and perform media specific operations.

The storage controller 110 is an interface device for local storage functionality. The storage controller 110 can access local storage devices to retrieve data elements, provide system booting functionality, provide backup, act as a level of hierarchical storage, and other data storage related functions.

The processor module 202 can also include a fabric controller 210 connected to other processing, memory, and storage elements via the memory access interconnection 208. The fabric controller 210 is a communication interface that can transfer data and control information over a network connection based on the routing information associated with the data.

The memory access interconnection 208 is a network of communication links between processor, memory, and storage nodes of the deaggregated computing system 200. The memory access interconnection 208 can help implement routing, speed and flow control, bulk transfers, and other network functionality.

The deaggregated computing system 200 can include the media module 204 attached to the memory access interconnection 208. The media module 204 is a computing device that provides access to external processing, memory, or storage devices. The media module 204 can provide access to additional deaggregated resources that are available to other modules attached to the memory access interconnection 208.

The media module 204 can have a variety of configurations. For example, the media module 204 can include a media controller 212, the fabric controller 210, the memory controller 106, and the storage controller 110.

The media controller 212 is a processing element to control the media module 204. The media controller 212 can be a central processing unit, a controller, a graphical processing unit, a microcontroller, a state machine, a dedicated hardware module, a field programmable gate array, an application specific integrated circuit, or a similar device. The media controller 212 can include internal memory areas and registers for performing operations and intermediate operations on the data elements.

The media controller 212 can have a variety of configurations. For example, the media controller 212 can be a customized device for interfacing with specific hardware such as a DRAM controller, a resistive memory controller, a phase change memory controller, a spin transfer torque memory controller, an optical device controller, a solid-state storage device controller, a hybrid controller, or a controller for other similar devices.

The media controller 212 can have a variety of configurations. For example, the media module 204 can be a DRAM module having a dedicated DRAM controller. In another example, the media module 204 can be a resistive random-access memory (ReRAM) module having a media controller 212 configured to access ReRAM device. In yet another example, the media module 204 can be a storage module have a redundant array of inexpensive disks (RAID) controller for interfacing with mass storage devices configured as a RAID array.

The fabric controller 210 is a communication interface device that can route data and control information to other components of the deaggregated computing system 200. The fabric controller 210 provides access to the processing, memory, or storage devices attached to the media module 204.

The fabric controller 210 can have a variety of configurations. For example, the fabric controller 210 can implement a high-speed field programmable gate array (FPGA) switch fabric or interconnect. It is understood that the fabric controller 210 can be configured to utilize different network types to provide the communication services for the memory access interconnection 208.

The memory controller 106 on the media module 204 is an interface device for accessing local memory, such as a local data store (LDS). The memory controller 106 is coupled to the media controller 212 to allow access to memory units 214 from external modules.

The memory controller 106 on the media module 204 can perform a variety of functions. This can include data storage and retrieval, servicing high-level commands such as reads and writes, enforce ordering and timing, perform path selection, translate addresses, handle external requests, cache memory requests, and perform media specific operations.

The memory controller 106 can be directly connected to the memory units 214. The memory units 214 can have a variety of configurations and capacities. For example, the memory units 214 can be DRAM, SRAM, ReRAM, hybrid memory units, or a combination thereof. The memory units 214 can have the same or different configuration as the local memory 104.

The storage controller 110 on the media module 204 is an interface device for accessing the storage units 218. The storage controller 110 is coupled to the media controller 212 to allow access to the storage units 218 from external modules.

The storage controller 110 can perform a variety of functions. The storage controller 110 can store and retrieve data elements, act as a level of hierarchical storage, stream data to external devices, perform error correction, backup data, and other data storage related functions.

The storage units 218 can be implemented in a variety of ways. For example, the storage units 218 can be hard drives, solid-state storage units, flash memory, resistive memory, phase change memory, spin transfer torque memory, optical memory, or other similar non-volatile memory.

The processor module 202 can access the local memory 104 and storage units 218 in a variety of ways. For example, the processor 102 can access the local memory 104 using a byte or word address. The processor module 202 can also access the storage units 218 using a logical block address. Alternatively, the processor module 202 can access the storage units 218 using a byte or word address where the byte address can be translated into a logical block address by the storage controller 110.

Deaggregating the memory units 214 and the storage units 218 from the processor module 202 increases flexibility, improves accessibility, and increases capacity available to the processing elements. By making the memory units 214 and the storage units 218 available via the fabric controller 210, the processing elements can access more memory and storage capacity than can be direct attached to the processing elements. In addition, having multiple units provides a redundancy that makes memory and storage available during component failures.

The resources controlled by the media module 204 can be shared resources accessible to other devices connected to the memory access interconnection 208. Because the deaggregated computing system 200 can include a plurality of modules having processing, memory, and storage devices, the aggregate level of resource availability is increased. Disaggregating compute nodes and memory storage devices also increases available bandwidth to the compute nodes.

Figure 3:
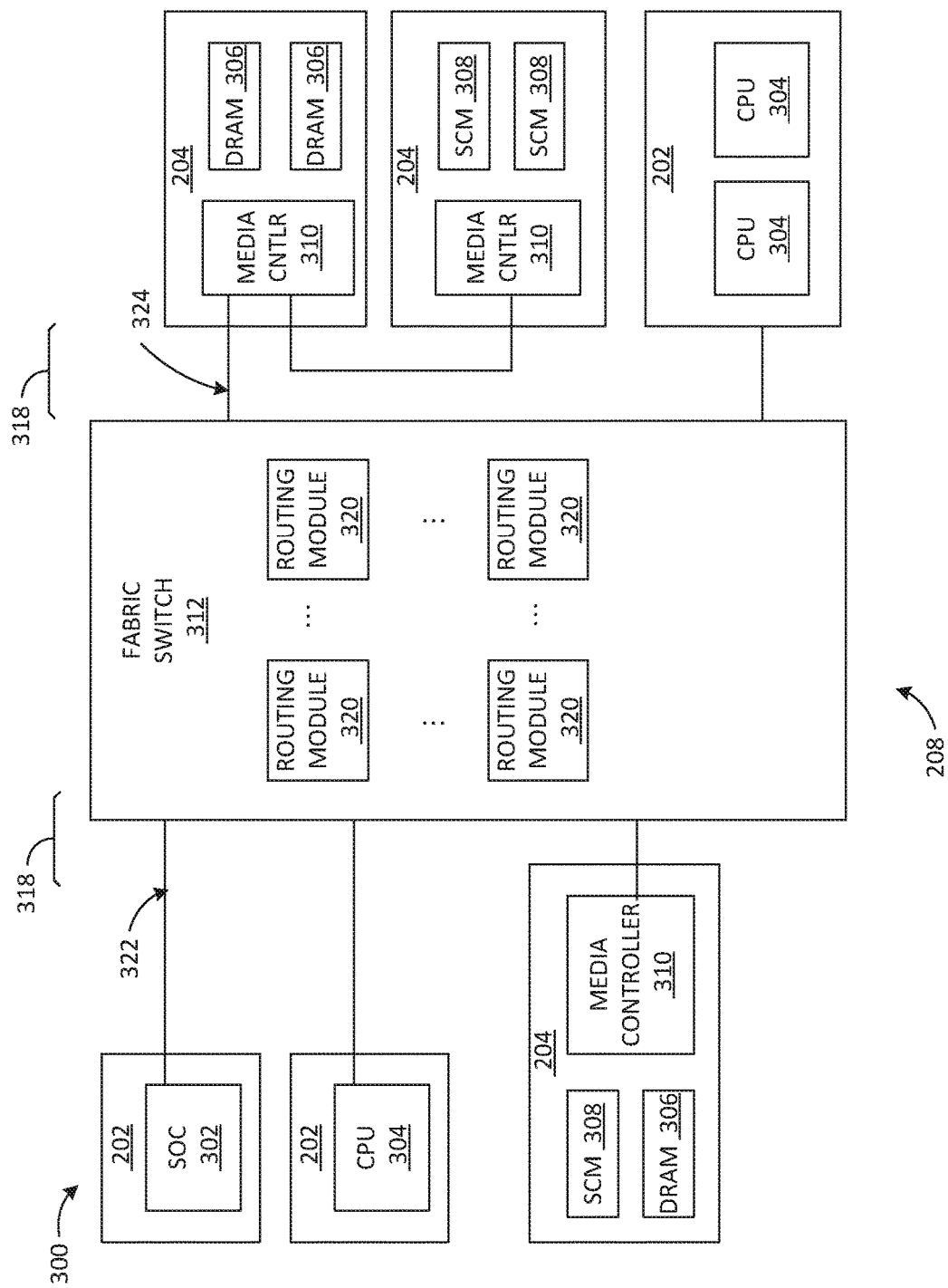
FIG. 3 depicts an illustrative example of a deaggregated computing system according to a further embodiment.

FIG. 3 illustrates an example of a deaggregated computing system 300 in further embodiment. The deaggregated computing system 300 shows an example of a combination of processing elements, memory elements, and storage elements, each connected to a fabric switch 312 with communication links 318.

The deaggregated computing system 300 shows different hardware configurations that can support sharing system-wide resources. The deaggregated computing system 300 demonstrates a multiprocessor configuration with a variety of different types of the processor units and different media and storage configurations. For example, the deaggregated computing system 300 shows several different processor units accessing the memory and storage devices through a fabric switch. The fabric switch can provide routing connectivity between the processors and the media units. In addition, the media units can include storage units that are directly connected to the fabric switch as well as those connected in a daisy-chain connection.

The deaggregated computing system 300 can include one or more processor modules 202 coupled to the fabric switch 312. The processor modules 202 can include different types of processing units. For example, the deaggregated computing system 300 can include system on a chip module 302, a central processing unit module 304, graphical processing unit modules, multiprocessor modules, FPGA modules, processor with accelerator modules, or a combination thereof. The processing units can operate singly or in a group with applications on a single processor or spread across a group.

Each of the processing units can access data stored in the memory units 306 and the storage units 308. For example, the memory units 306 can include a dynamic random-access memory (DRAM) module or other volatile memory modules. In another example, the storage units 308 can include a storage-class memory (SCM) module such as disk drives, solid-state storage units, optical drives, or similar storage devices.

The deaggregated computing system 300 can include the media modules 204 to provide access to the memory units 306 and the storage units 308 attached to the media module 204. For example, the media module 204 can include the media controller 310 to provide access to the storage units 308, such as the storage-class memory modules. Another one of the media modules can include the media controller 310 to provide access to the memory units 306, such as a DRAM module.

The media modules 204 can have a variety of configurations. For example, the media modules 204 can be directly connected to the fabric switch 312. In another embodiment, the media modules 204 can be connected in a daisy-chain configuration.

The deaggregated computing system 300 can include the fabric switch 312. The fabric switch 312 is a networking element to allow each of the processing and media modules to connect to one another. The fabric switch 312 can provide direct network connectivity to each connected module. The fabric switch 312 can also be implemented as a multi-protocol networking system that can link different networks, routers, switches, and the communication links 318.

The fabric switch 312 can implement the memory access interconnection 208 using a variety of technologies. For example, the memory access interconnection 208 can be a high-speed serial physical layer technology. The memory access interconnection 208 can include multiple serial links operating at different speeds to provide the required communication bandwidth between the modules of the deaggregated computing system 300. In another example, the serial links can operate at speeds of 16, 25, 28, 56, and 112 gigatransfers per second (GT/s) or faster.

The fabric switch 312 can be implemented using routing modules 320. The routing modules 320 are communication devices that can route data and commands within the fabric switch 312. For example, the data received from the processing units is routed through the fabric switch 312 using the routing modules 320. The routing modules 320 can be configured in an array, cloud, network, crossbar, or other similar networking structure. The fabric switch 312 can include switch inputs 322 that can be mapped to switch outputs 324 for transferring the data and commands.

Although the fabric switch 312 is shown with four of the routing modules 320, it is understood that the fabric switch 312 can have any number of the routing modules 320. The number of the routing modules 320 can be determined by the requirements for performance, capacity, speed, delay, or other networking properties.

The fabric switch 312 can be configured to support routing data and command via different paths through the switch. For example, the fabric switch 312 can be configured to support transferring data and command from one input to one output, from multiple inputs to one output, from one output to one input, and from one output to multiple inputs.

The fabric switch 312 can be coupled to the communication links 318 implemented using electrical or optical connections. For example, the communication links 318 can include copper, optical fiber, broadcast media, coaxial cable, or a combination thereof.

The memory access interconnection 208 can operate using a variety of configurations. For example, the memory access interconnection 208 can use the communication links 318 operating in synchronous mode, asynchronous mode, or a combination thereof. Each of the communication links 318 can be configured at boot time and may change mode dynamically to adapt to application requirements.

Data applications are evolving and require exponentially larger data sets than previously. Applications such as artificial intelligence, big data, and voice processing require large amounts of data, large amount of memory to process the data, and large amounts of storage to preserve the data. Implementing the data storage and the memory of the deaggregated computing system 300 as disaggregated and independent memory and storage elements allows large amount of the data to be provided to the system with high speed and low latency.

In an illustrative example, the communication links 318 between the processor module 202, such as a system on a chip module, and the media module 204 can include an equal number of transmit and receive serial connections. In an alternate embodiment, the communication links 318 can have an asymmetric link interface with a higher number of receive serial connection than transmit serial connections. This can support the higher read bandwidth required by many applications.

Memory and storage access speeds, latency, and capacity are evolving as well. The time required to access static and dynamic RAM memory is decreasing, while the maximum capacity of storage devices is increasing rapidly. These evolving memory and storage capabilities must be integrated into existing and upcoming computing systems.

The memory and storage units can treat all communications as memory operations such as load/store, get/put, and other atomic operations. The processor units can issue load/store commands based on byte or object level data accesses and the media controllers can convert the load/store commands into hardware-specific instructions for the storage devices.

Figure 4:
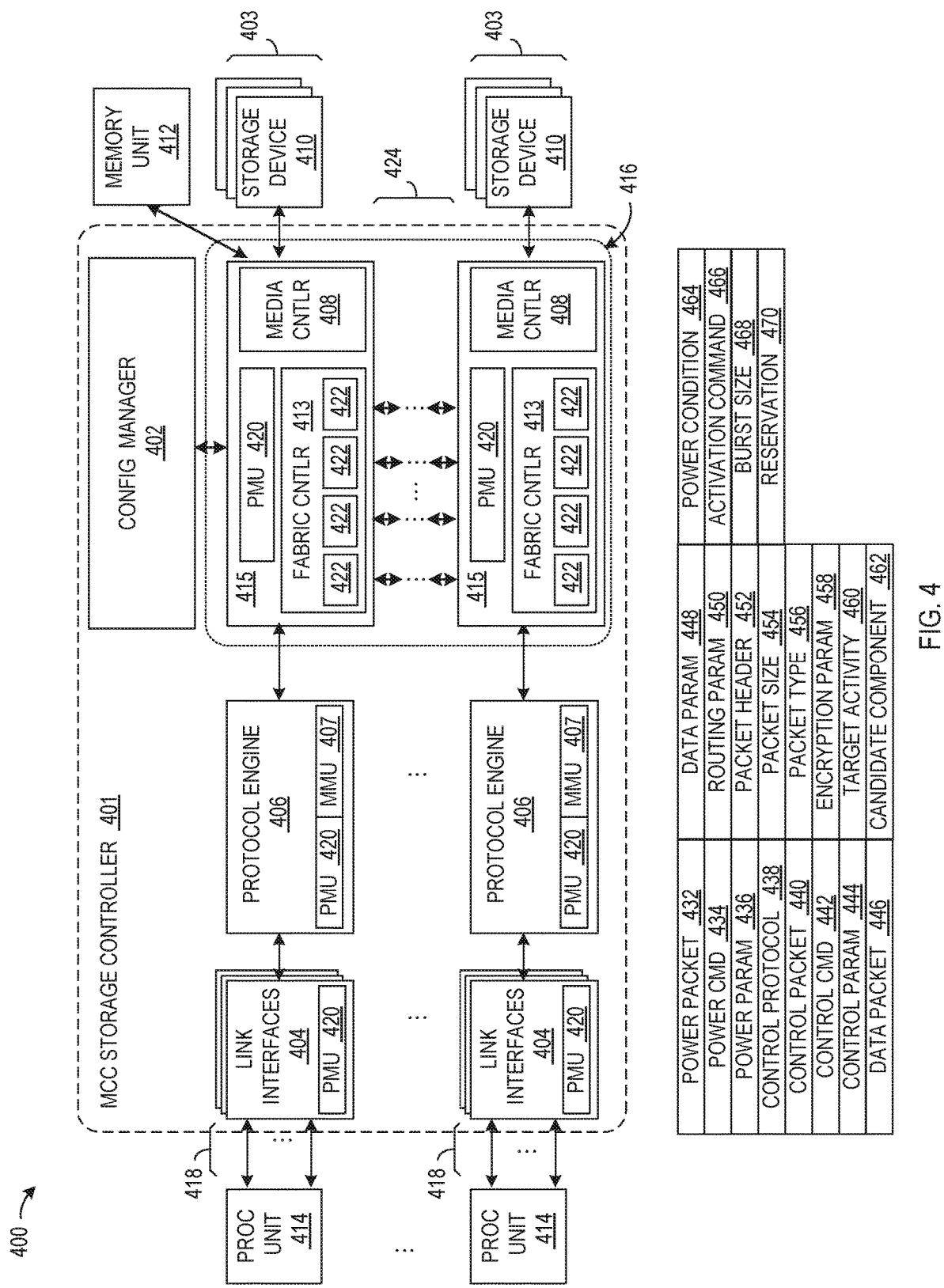
FIG. 4 depicts an illustrative example of deaggregated computing system with a memory centric computing storage controller, according to another embodiment.

FIG. 4 illustrates an example of a deaggregated computing system 400 with a memory centric computing storage controller 401. The deaggregated computing system 400 with the memory centric computing (MCC) storage controller 401 couples the processor elements to the memory and storage units via a device fabric 416.

The deaggregated computing system 400 is a dynamic computing resource with one or more of the processor units 414 dynamically coupled via the MCC storage controller 401 to memory units 412 and storage devices 410. The processor units 414 can be allocated memory and storage resources on an as needed basis.

The deaggregated computing system 400 can have a variety of configurations. For example, the deaggregated computing system 400 can include one or more processor units 414 connected to the MCC storage controller 401 with one or more communication links 418. The MCC storage controller 401 can also be connected to the storage devices 410 and the memory units 412.

The deaggregated computing system 400 is a composable system that is modular and dynamically configurable. For example, the storage devices 410 can be hot-swapped and added to the system while it is running. This functionality allows the system to add and remove resources as needed.

The MCC storage controller 401 is a computing and networking subsystem for coupling the processor units 414 to the storage devices 410. The MCC storage controller 401 can route control information and requests for data transfers to the appropriate device.

The MCC storage controller 401 can have a variety of configurations. For example, the MCC storage controller 401 can include a configuration manager 402 and one or more element rows 403 having link interfaces 404, protocol engines 406, media controllers 408, one or more of the storage devices 410, and one or more of the memory units 412. The MCC storage controller 401 can increase networking and storage capacity by adding additional sets of the element rows 403. The set of the element rows 403 can form the device fabric 416. The device fabric 416 is a network of element providing access and controlling transfers between processor units and the storage devices.

The MCC storage controller 401 can be controlled using the control protocol 438. The control protocol 438 can control the flow of data, the interpretation of commands, and the allocation of resources in the system.

The control protocol 438 is a set of rules, conventions, mechanisms, instructions, formats, and data definitions for operating the MCC storage controller 401. The control protocol 438 defines the structure of information packets that are exchanged to perform actions and transfer data within the MCC storage controller 401.

The control protocol 438 can have a variety of different configurations. For example, the control protocol 438 can be a packet-based protocol with command and data elements transferred in information packets. The control protocol 438 can transfer messages composed of information packets such as data packets 446, control packets 440, power packets 432, or other similar packet information.

The control packets 440 can contain commands and information for executing the commands. The control packets 440 can include configuration and command information for different components of the system. In one embodiment, the control packets 440 can include a packet header 452, a control command 442, and optionally one or more control parameters 444.

The packet header 452 is a data area in a packet that contain information about the packet, the packet type, the packet destination, and other packet meta data. The packet header 452 can include addressing information.

The control command 442 is the instruction information of the packet. It is the direction to perform an activity by one of the components. For example, the control command 442 can be an instruction to transfer data from one of the storage devices 410 to one of the processor units 414.

The data packets 446 can include the data payload. The data packets 446 can include the packet headers 452 and data parameters 448. The data parameters 448 are the data information or the data payload carried by the data packets 446.

The deaggregated computing system 400 can minimize latency by having the packet size of the data packets 446 match the device burst size 468 of the media device. The device burst size 468 is the size of the burst of data from the media device. The deaggregated computing system 400 can support multi-pathing and load balancing for transferring the packets of a control protocol 438.

The configuration manager 402 is a device for controlling MCC storage controller 401 of the deaggregated computing system 400. The configuration manager 402 is responsible for in-band management, acts as the memory map master, routing, security management, and coherency management. In-band management is the control of the device fabric. The configuration manager 402 is responsible for managing the memory map for allocating memory and storage resources to processor units.

The configuration manager 402 can include a memory map. In an embodiment, the memory map can describe the mapping between byte level addresses and the logical block addresses of the corresponding location in the storage devices 410. In another embodiment, the memory map can include information regarding memory areas that are being changed. For example, the memory map can flag a memory area that will be updated and create a reservation 470 to block access to that memory area by other processes.

The configuration manager 402 can deploy portions of the memory map to cache units in the protocol engine 406. In some embodiments, the memory map can include information regarding the status of a particular address. This can include reservation information for individual addresses, blocks, ranges of data, or entire devices.

The configuration manager 402 can control the composability of the system. The configuration manager 402 can detect when components are added or removed from the system. For example, the configuration manager 402 can update the memory map when one or more of the storage devices 410 is added or removed from the system.

The configuration manager 402 can dynamically control the routing of the packets of the control protocol 438 by sending the control packets 440 to the protocol engine 406. For example, the configuration manager 402 can implement multi-path routing by sending the control packet 440 with a routing parameter 450 to the protocol engine 406. In another example, the configuration manager 402 can implement load balancing by sending the control packet 440 with the control command 442 for load balancing and the control parameter 444 with load balancing information to the protocol engine 406.

The configuration manager 402 is responsible for managing security. This can include managing security keys for allowing access to memory areas for processing units and managing access rights. The configuration manager 402 can control which application on the processor units 414 are allowed to access data on each of the storage devices 410.

The configuration manager 402 is responsible for coherency management to make sure that memory sets are consistent. This can include coordinating memory access between different processor units to make sure each system sees the correct memory values. For example, two processor units can use a memory coherence protocol, such as using mutual exclusion semaphores, to coordinate changes to the memory. The systems can set a mutex indicating data changing, update both sets of memory to the same values, then update the mutex to show that data is coherent again.

For example, the memory map can indicate that a particular memory address is in use by creating the reservation 470. The reservation 470 can indicate that the data in one of the storage devices 410 is being updated and the latest version may not be available. The reservation 470 can be removed when the data has been updated and is coherent. The reservation 470 can be implemented with the mutex semaphore. The reservation 470 from the memory map can be distributed to the memory map cache of the protocol engines 406.

The configuration manager 402 can control a storage fabric module 415 that includes the media controller 408, a fabric controller 413, and the device fabric 416. The storage fabric module 415 contains the device interface and addressing mechanisms for routing information to the appropriate one of the storage devices 410. The device fabric 416 can connect to the storage devices 410 or other fabrics with routing parameters set by the configuration manager 402

The configuration manager 402 can also control power management in the deaggregated computing system 400. The configuration manager 402 can control the power mode and status of individual components and element rows in the system. The configuration manager 402 can receive information about current usage, power levels, routing information, etc.

The media controllers 408 are devices for controlling the storage devices 410. The media controllers 408 can translate data requests and generate the device-specific commands to transfer data from the storage devices 410. The media controllers 408 are coupled to the storage devices 410 and the fabric controllers 413.

In an alternative embodiment, the media controllers 408 can be configured to include a memory controller for controlling the memory units 412. The memory controller can translate data requests and generate the device-specific commands to transfer data from the memory units 412. The memory controllers are coupled to the fabric controller 413.

The fabric controllers 413 are devices for managing communication between components of the deaggregated computing system 400. The fabric controllers 413 can be coupled to the media controllers 408 and the protocol engines 406. The fabric controller 413 can form a network and route the packets between the processor units 414 to the storage devices 410. The fabric controller 413 can also transfer commands and control messages between all of the components of the MCC storage controller 401 of the deaggregated computing system 400.

The fabric controllers 413 can be controlled by the configuration manager 402. The configuration manager 402 can maintain a routing table and configure the fabric controller 413 to direct the packets to and from the storage devices 410 and the processor units 414.

The fabric controllers 413 can be connected to the fabric controllers 413 of a different row of elements. The fabric controllers 413 form an interconnected routing network that can transfer data and control information between the processor units 414 and the storage devices 410 and the memory units 412.

The fabric controllers 413 can be coupled to fabric interfaces 422. The fabric interfaces 422 are devices for routing packets of information between the element rows 403. The fabric controllers 413 can control one or more of the fabric interfaces 422.

The fabric interfaces 422 are devices for controlling fabric links 424 for communicating between the element rows 403. The fabric interface 422 can control one or more of the fabric links 424. The fabric links 424 can transfer information packets between sources and destinations.

The fabric interfaces 422 can have a variety of configurations. For example, the fabric interfaces 422 can include a serial interface, a parallel interface, a network interface, a broadcast interface, a point-to-point interface, an optical interface, an electrical interface, or other similar communication interfaces. In another example, the fabric interface 422 can include a serializer/deserializer (SerDes) unit for converting parallel data into serial data.

The fabric controller 413 can include one or more of the fabric interfaces 422. Each of the fabric interfaces can control one or more of the fabric links 424. The fabric links 424 are data channels for transferring data. The fabric links 424 can be configured as receive links, transmit links, or bi-directional links.

The fabric links 424 can have a variety of configurations. For example, the communication links 418 can be a serial data connection. The fabric links 424 can include a serial link, a parallel link, a network link, a broadcast link, a point-to-point link, an optical link, an electrical link, or other similar communication links.

The fabric controller 413 can route information packets between another fabric controller 413 in a different element row 403. The fabric controller 413 can select the fabric interface 422 for transferring the packets to the other fabric controller 413.

The fabric controller 413 can perform load balancing between the fabric interfaces 422 to balance performance, network load, and power requirements. For example, the fabric controller 413 can route the information packets though a single one of the fabric interfaces 422 to reduce power requirements by disabling or powering down the fabric interfaces 422 that are not being used. In another example, the fabric controller 413 can maximize performance by distributing the data traffic over all of the fabric interfaces 422.

The fabric controller 413 can optimize performance in a variety of ways. For example, the fabric controller 413 can distribute packet traffic over a set of the fabric interfaces 422 to improve performances and reduce the impact of data traffic bottlenecks. The fabric controller 413 can receive commands from the configuration manager 402 to distribute the traffic load over the set of fabric interfaces 422. In another embodiment, the fabric controller 413 can distribute the traffic load of the set of fabric interfaces 422 based routing information in the packet header 452 in the information packets it receives.

The protocol engine 406 is a device for managing the control protocol 438 across the MCC storage controller 401. The control protocol 438 defines the signals, messages, commands, data, and other elements used to control the deaggregated computing system 400. The protocol engine 406 can be responsible for managing the routing of control and data information, conversion between different data types, performance management, etc.

The protocol engine 406 can have a variety of configurations. For example, the protocol engine 406 can be configured to translate between high-level commands and low-level control commands for the components of the system, perform routing of control and data packets using a memory map, implement security procedures including performing encryption and decryption of data, and other protocol related tasks.

The protocol engine 406 can translate high level memory commands, such as load and store, and convert them into device-specific lower-level read and write commands. The protocol engine 406 can maintain a cache copy of the memory map associating byte level addresses with the associated logical block address on the storage devices.

The protocol engine 406 can manage the flow of packets based on the control protocol 438. The protocol engine 406 can manage power packets 432, control packets 440, data packets 446, and other packet types. Each of the packets can include a packet header 452 having related information about the packets such as a packet size 454, a packet type 456, routing parameters 450, and other packet metadata. For example, the packet type 456 can identify the purpose of the packet, while the routing parameters 450 can help control the primary route, alternate routes, high performance routes, priority, initial route, active route, or other routing-related configuration parameters.

The power packets 432 are packets for transferring control information about power management. The power packets 432 can include a power command 434 and optionally power parameters 436. For example, one of the power packets 432 can include the power command 434, such as enable a power savings mode, and the power parameter 436, such as the component identifier, mode level, mode type, or other similar parameters.

The control packets 440 are packets containing control information and commands. This can include routing information, mode changes, status update, data updates, device updates, configuration changes, or other similar control information. The control packets 440 can include a control command 442 and control parameters 444.

The data packets 446 are packets carrying data. This can include data retrieved from the storage devices 410, data from the processor units 414, data from the memory units 412, and other similar information.

The protocol engine 406 can support several different protocol packet formats. The protocol packets formats could include link-local packets, peer-to-peer core packets (P2P Core), P2P coherency packets, P2P vendor-defined packets, explicit packets, and other similar packet formats.

The protocol engine 406 can include a memory management unit 407 managing a cached version of portions of the memory map. The memory map can include a local and global mapping of the byte level addresses that correspond to the locations in one or more of the storage devices 410. The cache of the memory map can be formed with high speed memory chips for improved performance and faster routing of memory requests.

The protocol engine 406 can support system security by encrypting and decrypting the data traffic between two nodes. The protocol engine 406 can receive the security keys in an encryption parameter 458 from the configuration manager 402. The security keys can be linked to a user identifier that can be used to control a stream of encrypted data from an application controlled by the user. In another embodiment, the protocol engine 406 can limit access to one of the storage devices 410 based on the encryption parameter 458 linked to a data request from an application on the processor units 414.

The link interfaces 404 are devices for controlling the communication links 418. The link interface 404 can be configured to control a plurality of the communication links 418.

The link interface 404 can have a variety of configuration. For example, the link interface 404 can be a serializer/deserializer (SerDes) unit for converting parallel data into serial data.

The communication links 418 are channels for transferring data. The communication links 418 can be receive or transmit links.

The communication links 418 can have a variety of configurations. For example, the communication links 418 can be a serial data connection.

The components of the deaggregated computing system 400 can include a power management unit 420 for managing power consumption of the host component. The power management unit 420 is a device on the host component for implementing power management functionality on the host component. The power management unit 420 can also be coupled to the configuration manager 402 via the communication links 418

The power management units 420 can be coupled or attached to the host components which can include the link interfaces 404, the protocol engine 406, the storage fabric module 415, the fabric controller 413, the media controller 408, or similar components. The power management units 420 can also be configured on the processor units 414, the storage devices 410, and the memory units 412.

The power management unit 420 can reduce the amount of power used by the host module or unit in a variety of ways. For example, the power management unit 420 can control the power usage of the host component by turning off the power completely or switching the host component or subcomponent to a lower power mode. When the host component is in a low power or deactivated mode, the power management unit 420 can remain operational and turn the power back on or switch the host component into a normal power mode.

The power management unit 420 can control power usage by setting the host component to a lower power mode. The lower power modes can be implemented in a variety of ways. For example, the host components can include component-specific power modes that can be controlled with a control signal or command from the power management unit 420. The lower power modes can include techniques such as reducing clock speeds, switching to alternate lower power internal components, reducing available functionality, operating intermittently, routing data to inherently lower power components or units, or a combination thereof.

In another embodiment, the power management unit 420 can control the communication links 418 individually to reduce the power consumed by the host component. For example, the power management unit 420 can be controlled by one or more timers measuring the activity of each of the communication links 418. A link that has been not been utilized over a timer interval can be automatically turned off. Alternatively, the communication links that are deactivated can automatically be reactivated when data is received on the communication link 418.

In yet another embodiment, the power management unit 420 of the storage fabric module 415 can manage power in the storage fabric module 415. The power management unit 420 can selectively power down one or more of the fabric interfaces 422 if they are not being used. This can concentrate the data traffic over one or more of the fabric links 424 attached to one of the fabric interfaces 422.

The power management unit 420 can be controlled in a variety of ways. For example, the power management unit 420 of the storage fabric module 415 can be controlled by the configuration manager 402, by the fabric controller 413, by the storage fabric module 415, or a combination thereof.

The power management unit 420 of the storage fabric module 415 can control the power for the storage fabric module 415. In some embodiments, the power management unit 420 of the storage fabric module 415 can also control the power configuration of the fabric controller 413 and the fabric interfaces 422.

In another embodiment, power consumed by the communication links 418 can be reduced by switching the communication links 418 into a lower power mode. This can include reducing the clock speed of the link interface 404, operating at lower signal power levels, rerouting data packets to one of the communication links 418 that is already operating, lowering the power level of the communication signal, or a combination thereof.

The power management unit 420 can be managed in a variety of ways. For example, the power management unit 420 can be directly controlled by the configuration manager 402, controlled by a process on one of the host processor units 414, controlled by logic on the host component, controlled by the power management unit 420 itself, or a combination thereof.

The power management unit 420 can initiate a power reduction sequence when a power condition 464 is detected for a candidate component 462. The power condition 464 is an action or condition that makes the candidate component 462 suitable for a power reduction action. For example, the power condition 464 can be a condition such as lack of traffic or an unused state of the candidate component 462. The power condition 464 can be detected by the power management unit 420, the configuration manager 402, the processor unit 414, or a combination thereof.

The MCC storage controller 401 can identify the candidate component 462 and use one of the power management units 420 to change the power consumption of the candidate component 462. The candidate component 462 is a component of the system that can be controlled by one of the power management units 420 to reduce power consumption. For example, the candidate component 462 can be one of the communication links 418, the link interfaces 404, the protocol engine 406, the storage fabric modules 415, one of the fabric interfaces 422, one of the storage devices 410, or other similar system components.

The components in a lower power mode can be reactivated by receiving an activation command 466. The activation command 466 is an instruction to switch out of the lower power mode. The activation command 466 can be self-generated or received from the configuration manager 402.

In one example, the communication links 418 can be reactivated if the link interface 404 received the activation command 466 from the configuration manager 402. The activation command 466 can be the target activity 460. In yet another example, the communication links 418 can automatically be reactivated based on the target activity 460 of the expiration of a pre-defined time interval. In a further example, the processor units 414 can send the activation command 466 to the link interface 404 using one of the communication links 418 that is still active or using a separate command channel. The activation command 466 is an instruction, such as a power command 434 in one of the power packets 432, instructing the power management unit 420 to reactivate the link interface 404.

During regular operation, the system can identify the candidate component 462 and reduce the power consumption level of the component. The candidate component 462 can be identified by the power management unit 420 in the local module, by the configuration manager 402, by one of the processor units 414, or a combination thereof.

In an illustrative example, one of the link interfaces 404 can detect that one or more of the communication links 418 are not in use and identify each of them as the candidate component 462. The power management unit 420 can then deactivate the candidate component 462 to reduce power consumption. In another example, the configuration manager 402 can determine that one of the storage devices 410, such as a disk drive, is not being used and initiate a power down on the disk drive until it needs to be used.

The reduction in power consumption can occur in a variety of ways. For example, the power management units 420 can detect the candidate component 462 asynchronously when the candidate component 462 meets the proper criteria. The power management unit 420 can identify one of the communication links 418 as the candidate component 462 when it has not been used for a period of time.

In another example, the power management unit 420 can receive a command from the configuration manager 402 to evaluate the system and identify the candidate components 462. When a large dataset has been deleted, the configuration manager 402 can determine that one or more of the storage devices 410 are empty and send the power command 434 to the power management unit 420 to deactivate the storage devices 410 that have been identified as the candidate component 462.

Reducing power to unused components can reduce the amount of waste heat dissipated by the deaggregated computing system 400. Further reducing power based on detecting unused components such as communication links, storage devices, or portions of the device fabric 416 can increase the operational lifespan of the components. Reducing power can allow for additional processing units by reducing power in other parts of the system.

3.0. Implementation Mechanism—Hardware Overview 3.1. Link Interface

Figure 5:
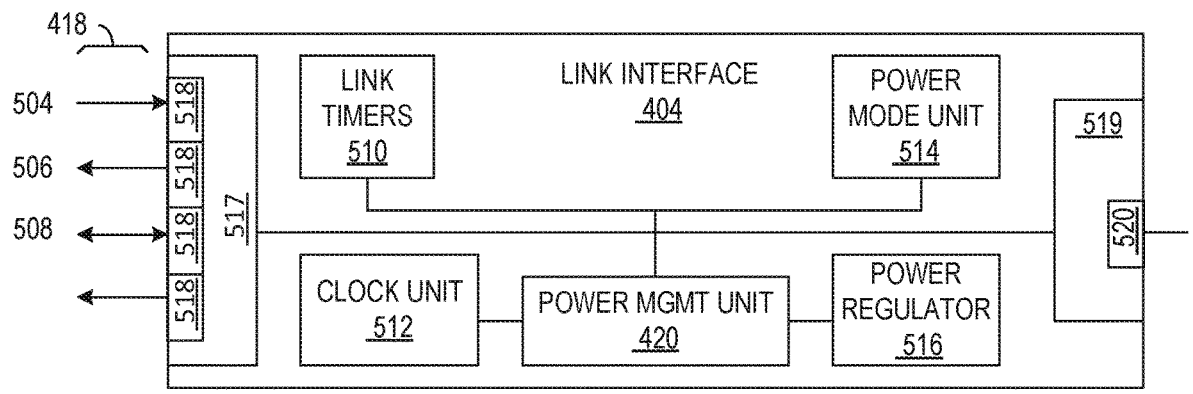
FIG. 5 depicts an example of a link interface.

FIG. 5 illustrates an example of the link interface 404. The link interface 404 can manage the communication links 418 between components of the deaggregated computing system 400. The link interface 404 can support high speed communications.

The link interface 404 is a communication device for transferring information between components of the deaggregated computing system 400. The link interface 404 can transfer information between the processor units 414 and the other elements of the MCC storage controller 401.

The link interface 404 can include one or more of the communication links 418. For example, the link interface 404 can be configured to support between 1 and 128 of the communication links 418 or more. In some embodiments, the link interface 404 can be configured to support more than 128 of the communication links 418.

The communication links 418 can have different types. The communication links 418 can be a receiver link 504, a transmitter link 506, a bi-directional link 508, or a combination thereof. For example, the receiver link 504 can receive data at the link interface 404 from the processor units 414. The transmitter link 506 can send data from the link interface 404 to the processor units 414. The bi-directional link 508 can both send and receive data between the link interface 404 and the processor units 414.

The communication links 418 can be dynamically reconfigured to change the type of link to another type. For example, one of the communication links 418 can be reconfigured from a transmitter to a receiver or from a receiver link into a transmitter link or bi-directional link.

The link interface 404 can include an external port controller 517 having one or more external data ports 518. Each of the external data ports 518 can be connected to one or more of the communication links 418. The external data ports 518 are devices for sending and receiving the information over the communication links 418 between the link interface 404 and the processor units 414. For example, the external data ports 518 can be electrical or optical communication devices for providing serial data communication.

The external port controller 517 is a device for managing the external data ports 518. The external port controller 517 can include a microcontroller for executing software and firmware to control the external data ports 518. The external port controller 517 can control the data speed, the control protocol, power levels, operation mode, and other operational parameters of the external data ports 518.

The link interface 404 can include an internal port controller 519 having one or more internal data ports 520. The internal data ports 520 can be coupled to the components of the MCC storage controller 401 through the storage fabric modules 415. The internal data ports 520 are devices for communicating with the other components of the MCC storage controller 401. For example, the internal data ports 520 can support a serial interface, a network interface, a broadcast internal, or other network switching interface.

The internal port controller 519 is a device for managing the internal data ports 520. The internal port controller 519 can include a microcontroller for executing software and firmware to control the internal data ports 520. The internal port controller 519 can control the operational parameters of the internal data ports 520.

The link interface 404 can include the power management unit 420. The power management unit 420 of the link interface 404 can control the power consumption of the link interface 404 in a variety of ways. For example, the power management unit 420 of the link interface 404 can reduce power usage by turning off and on the communication links 418, switching the link interface 404 to a lower power operational mode, turning off or on other components, reducing the operational characteristics of the communication links 418, changing the local clock frequency, lowering voltage levels, or other similar techniques.

The power management unit 420 can reduce power by turning on and off the communication links 418. Because the communication links 418 and their related hardware can consume large amounts of power, limiting the number of active links can significantly save power. The communication links 418 can be controlled using the external data ports 518.

The power management unit 420 can identify the power condition 464 of the communication links 418 that are candidates for temporary deactivation in a variety of ways. For example, the link interface 404 can include link timers 510 for the communication links 418 to measure a variety of parameters. The link timers 510 are devices for measuring time between events. The link timers 510 can be implemented as a clock unit with logic and a series of registers to record start and stop events.

The link timers 510 can act as inactivity timers to measure an inactivity time 524 for each of the communication links 418 to indicate the amount of time since the communication links 418 last carried communication traffic. If the inactivity time 524 is greater than or equal to an activity threshold 522, then the power management unit 420 can deactivate the circuitry for one of the communication links 418. The expiration of the link timers 510 can be the power condition 464.

The communication links 418 that have been deactivated can be reactivated in a variety of ways. For example, the link interface 404 can include monitoring circuitry to monitor incoming traffic on the communication links 418. The incoming traffic can be the target activity 460 to trigger the reactivation. When traffic is received, the monitoring circuitry can request a pause in on-going traffic until the circuitry for the communication link is reactivated and the unit is ready to resume communications. When the communication link indicates that it is ready, then the incoming traffic can continue.

In another example, the communication links 418 can be reactivated if the link interface 404 received an activation command 466 from the configuration manager 402. The activation command 466 can be the target activity 460. In yet another example, the communication links 418 can automatically be reactivated based on the target activity 460 of the expiration of a pre-defined time interval. In a further example, the processor units 414 can send the activation command 466 to the link interface 404 using one of the communication links 418 that is still active or using a separate command channel. The activation command 466 is an instruction, such as a power command 434 in one of the power packets 432, instructing the power management unit 420 to reactivate the link interface 404.

In still another embodiment, the power management unit 420 can reduce power by changing a clock frequency 526 of a clock unit 512. The clock unit 512 is a timing element associated with the link interface 404. The clock unit 512 can control the rate at which operations are performed by the link interface 404. For example, the clock unit 512 can control the rate of data transmission over the communication links 418 of the link interface 404. The power management unit can restore the clock unit 512 to normal operation by resetting the clock frequency 526.

In another illustrative example, the power management unit 420 can reduce power by switching the link interface 404 into a lower power operating mode by controlling a power mode unit 514. The power mode unit 514 is a control element that can change the operation of the link interface 404. For example, the power mode unit 514 can include a set of registers to control the operation of portions of the link interface 404.

The power management unit 420 can send commands to the power mode unit 514 of the link interface 404 to alter the operational parameters to reduce power. For example, the power management unit 420 can send commands to the power mode unit 514 of the link interface 404 to reduce the operational voltage, deactivate sub-components of the link interface, reduce the clock speed of the link interface, reduce the clock speed of the communication links, change to a balanced communication mode, switch to a lower power operational process, increase the data buffering levels, or other similar techniques.

In yet another embodiment, the power management unit 420 can reduce power consumption by controlling a power regulator 516 to change the electrical power levels within the link interface 404. The power regulator 516, such as a voltage regulator, can be configured by the power management unit 420 to lower a voltage level to reduce power consumption of the link interface 404.

The power management unit 420 can restore the link interface 404 to normal operation in a variety of ways. For example, the power management unit 420 can receive the activation command 466 to restore normal operation by receiving the power command 434 and the power parameter 436 in one of the power packets 432 from the configuration manager 402. The power packets 432 are control packets that can contain power management information. For example, the configuration manager 402 can send the power packet 432 having the power command 434 and the power parameter 436. The power command 434 can be instructions for deactivating one of the communication links 418 on one of the link interfaces 404. The power parameter 436 can include the information to identify which of the communication links 418 and which one of the link interfaces 404 should be deactivated. The power parameter 436 is a set of data values that control how the power command 434 is performed. The link interface 404 can provide a link status 528 to show the operational mode and status of the link interface 404. For example, the link status 528 can indicate performance level, version, speed, activity level, power mode, or other similar status values.

In another example, the power management unit 420 can restore normal operation when a timer reaches or exceeds a predefined threshold. In yet another example, the power management unit 420 can monitor the communication links 418 and restore normal operation of the link interface 404 when a packet is received on one of the communication links 418.

3.2. Protocol Engine

Figure 6:
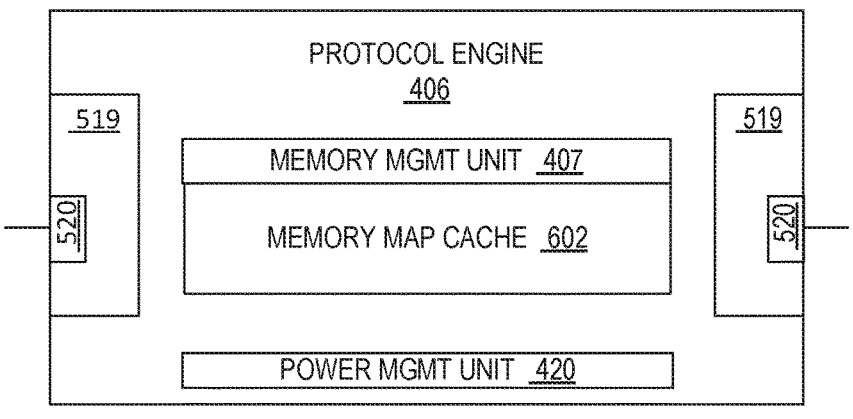
FIG. 6 depicts an example of a protocol engine.

FIG. 6 illustrates an example of the protocol engine 406. The protocol engine 406 is a device for managing the control protocol 438 across an element row of the MCC storage controller 401. The protocol engine 406 can receive a bitstream from the link interface 404 using the internal data ports 520 and generate another bitstream that is sent to the storage fabric module 415 using another of the internal data ports 520 and routed to the other components, such as the storage devices 410.

The protocol engine 406 can include dedicated hardware for forming, routing, and managing network packets across the MCC storage controller 401. For example, the protocol engine 406 can receive a data transfer request from one of the processor units 414 via the link interfaces 404 and create the control packets 440 and the data packets 446 that will be passed to the storage fabric module 415 for routing to the appropriate one of the storage devices 410. The data can be transferred between the media controller and the storage devices 410 and then the results can be routed back to the processor units 414 that requested the data transfer. The protocol engine 406 can include one or more of the internal port controllers 519 for controlling the internal data ports 520.

The protocol engine 406 can include a memory map cache 602 of a portion of the memory map master of the configuration manager 402. The memory map cache 602 can map a byte address in the transfer request to one of the storage devices. The protocol engine 406 can include routing functionality to transfer the packets between the processor units 414 and the storage devices 410. The protocol engine 406 has a copy of the routing information and includes the routing information in packets sent to the fabric controller 413. The fabric controller 413 reads the routing information and routes the packet to the correct destination. The routing information is modified by the configuration manager 402.

The protocol engine 406 can manage network performance. For example, the protocol engine 406 can configure the size of the data packets 446 to match the device burst size 468 of the target storage device to improve data transfer rates. This can increase the efficiency of the data transfer by avoiding unused space in the data packets 446. The device burst size 468 is the maximum amount of data that can be transferred in a single operation.

The protocol engine 406 can manage security in a variety of ways. For example, the protocol engine 406 can encrypt and decrypt data transferred between the storage devices 410 and the processor units 414. In another example, the protocol engine 406 can control access to system components by only allowing registered users and applications access certain system resources.

The protocol engine 406 can have different hardware configurations. For example, the protocol engine 406 can include the power management unit 420 and the memory management unit 407. The power management unit 420 can control the power usage of the protocol engine 406 and related components. For example, the power management unit 420 can configure the protocol engine 406 to operate in a lower power mode or to deactivate sub-components. The power management unit 420 can be controlled by the configuration manager 402 or operate in a standalone mode.

The memory management unit 407 is a device for controlling access to memory and storage. The memory management unit 407 can manage the memory map cache 602 which is the local copy of portions of the memory map master in the configuration manager 402. The memory map can include a local and global mapping of the byte level addresses that correspond to the block level locations in one or more of the storage devices 410. The memory map cache 602 can be formed with high speed memory components for improved performance and faster routing.

3.3. Configuration Manager

Figure 7:
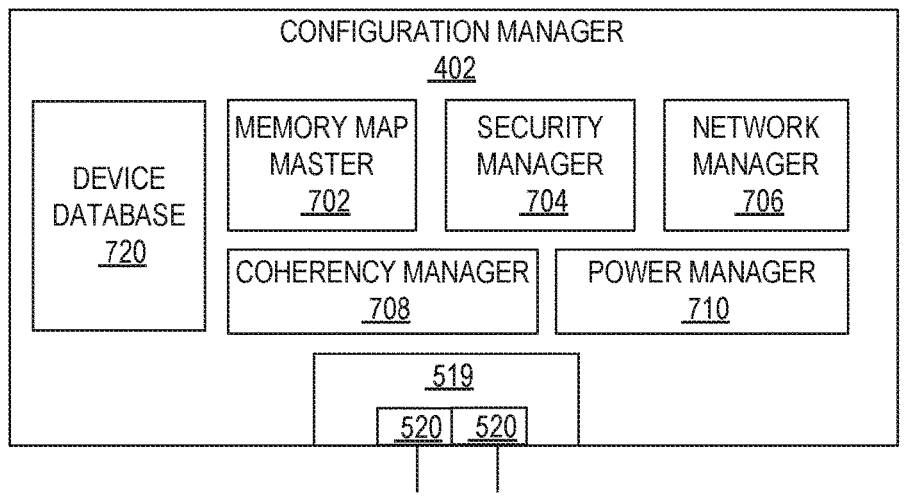
FIG. 7 depicts an example of a configuration manager.

FIG. 7 illustrates an example of the configuration manager 402. The configuration manager 402 is a device for controlling and managing the memory centric computing storage controller 401.

The configuration manager 402 is the master controller for the MCC storage controller 401. The configuration manager 402 is responsible for detecting changes to the hardware configuration including adding and removing the processor units 414 and the storage devices 410. The configuration manager 402 is responsible for controlling and provisioning the protocol engines 406, the fabric controllers, the media controllers 408, and the power management units 420.

The configuration manager 402 can maintain a device database 720 to keep information about each of the devices based on a device identifier 722 to uniquely identify each of the devices in the system. The information about each of the devices can include a performance metric 724, an in-use flag 726, a power status 728, or other similar information. The performance metric 724 is information indicating the level of performance of each of the components. This can show when a device is overloaded or busy. The in-use flag 726 can show when a device is being used to transfer data. The power status 728 can show whether a device is in a reduced power mode or inactive by comparing the power status 728 to a power threshold 734. If the power status 728 is less than or equal to the power threshold 734, then the device is in the reduced power mode.

The device database 720 can be updated and maintained by the components of the configuration manager 402. The power manager 710 can update the device database 720 when a device changes the current value of the power status 728. The performance metric 724 and the in-use flag 726 can be updated by a network manager 706, a memory map master 702, and a coherency manager 708 as the devices are used or freed during operation.

The configuration manager 402 can include the internal port controller 519 and one or more of the internal data ports 520. The configuration manager 402 can be coupled to one or more of the storage fabric modules 415 via the internal data ports 520.

The configuration manager 402 maintains the memory map master 702. The memory map master 702 maps the individual byte addresses of the data space to the logical blocks of the storage devices 410. The configuration manager 402 can dynamically manage the allocation of memory areas in the storage devices 410 and map them to byte level addresses accessible by the processor units 414. The configuration manager 402 can manage the transfer of portions of the memory map master 702 to the memory map cache 602 of the protocol engine 406.

The configuration manager 402 can include a security manager 704. The security manager 704 can be a device or system for implementing security policy within the MCC storage controller 401. The security manager 704 can perform a variety of functions. For example, the security manager 704 can control access to system resources by maintaining access control lists enabling users and processes to have access to data elements on the storage devices 410.

The security manager 704 can include a security database 730 containing the security information. An operation can be associated with a security identifier 732 which can be used with the security database 730 to show what security access and rights are associated with the security identifier 732.

The security manager 704 can also securely manage and transfer the security keys used by the protocol engine 406 to protect data transfers. The security manager 704 can send the encryption parameter 458 to the protocol engine 406 to allow the encryption and decryption of the data within one of the data packets 446 based on the authentication of a particular user.

The configuration manager 402 can include a network manager 706. The network manager 706 is a device for managing the device fabric 416 including the fabric controllers 413. The network manager 706 can be used to perform in-band management of the device fabric 416.

The configuration manager 402 can include a coherency manager 708. The coherency manager 708 is a device for resolving issue of data coherency. The coherency manager 708 can manage local, system level, and global coherence. For example, the coherency manager 708 can manage the response to load and store commands to propagate the correct data to different nodes in the system.

The coherency manager 708 can coordinate the creation and usage of mutual exclusions semaphores (mutex) to manage the coherence of data. For example, changes to the memory map cache in one of the protocol engines 406 can be tracked by setting a mutex 712 on other protocol engines 406 to indicate that the data is being changed. Once the memory map cache 602 on the other protocol engines 406 have been updated, the mutex 712 can be reset indicating the data is now consistent. The coherency manager 708 ensures that the external requests are blocked while the protocol engines 406 and fabric controllers 413 are updated to prevent external requests from being processed differently. There is a lock request packet 714 sent by the coherency manager 708 and an acknowledgement packet 716 returned by a target node. The coherency manager 708 waits for the acknowledgement packet 716 in response to the lock request packet 714 before modifying the protocol engine 406 and the configuration of the fabric controller 413.

The configuration manager 402 can include a power manager 710. The power manager 710 is a device that can monitor and control the power usage of the MCC storage controller 401 by controlling the power management units 420 of the various system components such as the link interface 404, the protocol engine 406, and the storage fabric module 415.

The power manager 710 can manage the power usage in a variety of ways. The power manager 710 can send the power commands 434 to the power management units 420 on any of the components of the system to control power consumption. The power manager 710 can scan the memory map master and a routing table to determine if some of the storage devices 410 are unused and deactivate them. The power manager 710 can determine the amount of data bandwidth needed for an operation and limit the number of the communication links 418 that are needed and deactivate some of the other communication links 418.

The power manager 710 can manage power on a scheduled basis. The power manager 710 can maintain a schedule of known usage for elements within the system. If a set of elements are not scheduled for use for a period of time, the power manager 710 can send the power commands 434 to the candidate components 462 that can be configured to a lower power mode.

3.4. Storage Fabric Module

Figure 8:
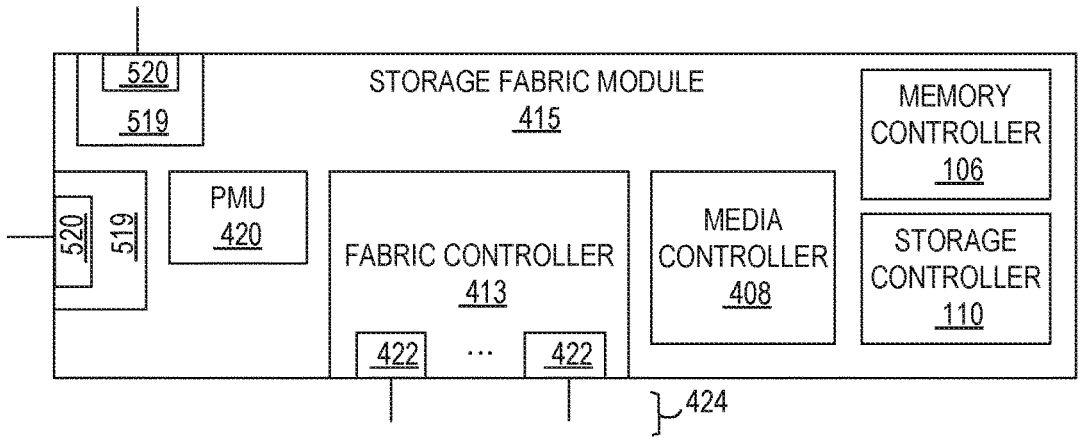
FIG. 8 depicts an example of a storage fabric module.

FIG. 8 illustrates an example of the storage fabric module 415. The storage fabric modules 415 are devices for managing access between the processor units 414, the protocol engine 406, the device fabric 416, the memory units 412, and the storage devices 410.

The storage fabric modules 415 can form the device fabric 416 for routing information packets between the processor units 414 and the storage devices 410. The storage fabric module 415 can support packet addressing, flow control, multipath routing, redundant routing, power management, and other data network functionality.

The storage fabric modules 415 can be combined, arranged, and configured in different ways to form the device fabric 416 by coupling an array of the storage fabric modules 415 together to allow the transfer of information from one module to another. The device fabric 416 can be configured in different ways including a single column of the storage fabric modules 415, an n by m array of the storage fabric modules, a single row of the storage fabric modules 415, a cloud-type configuration, an incomplete array, ring configuration, a cross-bar configuration, or a combination thereof.

The storage fabric module 415 can have different internal configurations. For example, the storage fabric module 415 can include the fabric controller 413, the fabric interfaces 422, the power management unit 420, the media controller 408, the memory controller 106, and the storage controller 110.

The fabric controller 413 is a networking device for communicating and managing the other components of the MCC storage controller 401. The fabric controller 413 can have network links to the protocol engine 406, the configuration manager 402, and one or more of the storage fabric modules 415.

The fabric controller 413 can have one or more of the fabric interfaces 422. The fabric interfaces 422 are communication devices for transferring information between the fabric interface 422 and another of the fabric interfaces 422 that is coupled to another of the fabric controllers 413 of another element row. Although the figures show four of the fabric interfaces 422, it is understood that the storage fabric module 415 can have any number of the fabric interfaces 422.

Depending on the location of the storage fabric module 415, the fabric interfaces 422 can be used to communicate with modules that are above, below, left, right, or otherwise offset from the module. Each of the fabric interfaces 422 of one of the storage fabric modules 415 can be coupled to another of the fabric interfaces 422 of another of the storage fabric modules 415.

The fabric interfaces 422 can have a variety of configurations. For example, the fabric interfaces 422 can be a serial interface, a parallel interface, a network interface, a broadcast interface, a bus interface, a point-to-point interface, an optical interface, an electrical interface, or other similar communication interfaces. In another example, the fabric interface 422 can include a serializer/deserializer (SerDes) unit for converting parallel data into serial data.

Each of the fabric interfaces 422 can control one or more of the fabric links 424. The fabric links 424 are data channels for transferring data. The fabric links 424 can be configured as receive links, transmit links, or bi-directional links.

The fabric links 424 can have a variety of configurations. For example, the fabric links 424 can be implemented as a serial link, a parallel link, a network link, a broadcast link, a bus link, a point-to-point link, an optical link, an electrical link, or other similar communication links.

The storage fabric module 415 can communicate between the element rows 403 using the fabric controller 413 and the fabric interfaces 422. The fabric controller 413 can route the information packets from the fabric controller 413 of one element row 403 to the fabric controller 413 of another via one of the fabric interfaces 422. The information packets can include the data packets 446, the control packets 440, and the power packets 432.

The information packets can be routed from one fabric controller 413 to another fabric controller 413 based on the routing parameter 450 of the information packets. The routing parameter 450 can include the addressing information for the initial source of the information packet, the final destination of the information package, and intermediate locations within the device fabric 416.

For example, the routing parameter 450 can include addressing information identifying the fabric interface 422 to be used for transferring information. The routing parameter 450 can include instructions to break up the information and transfer the information over one or more of the fabric interfaces 422. This can increase the available bandwidth to send the information to a different one of the element rows 403 by transferring the information over two or more of the fabric interfaces 422.

The fabric interfaces 422 can be coupled to a different one of the element rows 403. In one embodiment, the fabric interfaces 422 can be directly connected to the element row 403 directly adjacent to the current element row. In another embodiment, the fabric interfaces 422 can be connected to the fabric interfaces 422 of different element rows. This can allow faster access to the element rows 403 that are further away.

The media controller 408 can be coupled to the storage controller 110 and the memory controller 106. The media controller 408 can control the transfer the data between the fabric controller 413 and the storage devices 410.

The storage fabric module 415 can manage the storage devices 410 in a variety of ways. The storage fabric module 415 can configure the storage devices 410 as redundant arrays of inexpensive disks (RAID) disk arrays, perform automated backup operations, duplicate storage devices, perform maintenance operations, and other storage operations. The memory map master 702 and the associated copies of the memory map cache 602 in the different system components can be updated with the new disk configuration.

In one embodiment, the storage fabric module 415 can include the internal port controller 519 and one or more of the internal data ports 520 for communicating with the processor units 414, the protocol engine 406, and the configuration manager 402. The storage fabric module 415 can be coupled to the processor units 414, the link interfaces 404, the protocol engine 406 via the internal data ports 520.

The storage fabric module 415 can configure the storage devices 410 as RAID disk arrays for performance and data redundancy. The configuration manager 402 can send formatting and configuration commands to the storage fabric module 415 to form and dissolve RAID volumes. This can include any level of RAID volume including RAID-0 (striping), RAID-1 (mirroring), RAID-5 (distributed parity), or other RAID configurations. The storage fabric module 415 can communicate with other storage fabric modules 415 to form RAID volumes on different element rows.

In an illustrative example, the configuration manager 402 can determine that a large data set will be loaded on to the storage devices 410 and accessed by an application requiring a large bandwidth. The configuration manager 402 can automatically configure a group of the storage devices 410 into a RAID-0 volume to spread the data accesses over a larger number of the storage fabric modules 415 to improve performance.

The storage fabric module 415 can implement maintenance disk operations such as backup. The storage controller 110 of the storage fabric module 415 can be configured to backup or copy one of the storage devices 410 to another one of the storage devices 410 or to other types of media. For example, the storage devices 410 can be configured to include a tape device or other mass storage system for backup and offline storage. The MCC storage controller 401 can be configured to back up the storage devices 410 from one element row to the storage devices 410 of another element row.

The storage fabric module 415 can perform maintenance operations on the storage devices 410. For example, the storage controller 110 can execute error checking operations, defragmentation operations, load balancing, performance tuning, and other similar operations.

The power management unit 420 is a device for controlling the power usage of the storage fabric module 415 and the associated components. The power management unit 420 can be controlled by the configuration manager 402 or operate locally.

The power management unit 420 of the storage fabric module 415 can reduce power consumption by switching to lower power modes or selectively deactivating components. For example, the power management unit 420 can switch the storage fabric module 415 to a lower power mode by reducing the clock frequency, changing voltage levels, changing operational parameters, changing performance levels, or a combination thereof.

In another example, the power management unit 420 can deactivate the memory controller 106 or the storage controller 110 when not in use, such as in the case where there are no devices of that type connected to the controller. If the storage fabric module 415 is only connected to the storage devices 410, then the power management unit 420 can deactivate the circuitry for the memory controller 106 to save power.

The power management unit 420 can also deactivate unused devices, such as the storage devices 410 or the memory units 412. In an example, the power management unit 420 can detect that one or more of the storage devices 410 is unused or empty and deactivate that unit. This can include dissolving RAID volumes into individual components. The configuration manager 402 can scan the current state of the memory map master 702 to determine if there are any active connections to one of the storage devices 410. If there are not active connections, then the configuration manager 402 can send a message to the power management unit 420 of the storage fabric module 415 to deactivate and power down one of the storage devices 410.

3.5. Power Management Unit

Figure 9:
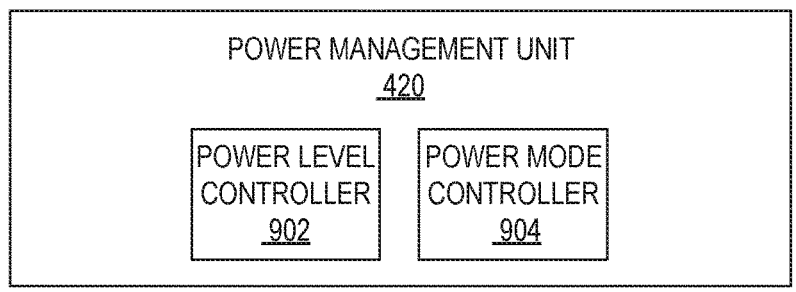
FIG. 9 depicts an example of a power management unit.

FIG. 9 illustrates an example of the power management unit 420. The power management unit 420 is a device for controlling the power usage of the components of the MCC storage controller 401. The power management unit 420 can be an embedded element within a host component of the MCC storage controller 401.

The power management unit 420 can control the power and power usage directly using a power level controller 902. The power level controller 902 is a device that can change the electrical power level of different elements of the host component. The power level controller 902 can include voltage regulators, voltage dividers, current limiting elements, bridge circuits, timers, resistors, capacitors, coils, transformers, or other electrical power elements.

The power management unit 420 can control the power usage indirectly by changing an operational mode of the host component using a power mode controller 904. The power mode controller 904 is a device for changing the settings of the host component to implement a lower power operating mode. The power mode controller 904 can include control codes for programming or setting operational registers on the host component. The power mode controller 904 can include a data storage area holding operation software to change the operation of the host component.

The power management unit 420 can be connected to the host components which can include the link interfaces 404, the protocol engine 406, the storage fabric module 415, the fabric controller 413, the media controller 408, or similar components. In an alternate embodiment, the power management unit 420 can also be configured on the processor units 414, the storage devices 410, and the memory units 412.

Controlling the power level or the power operational mode can help the MCC storage controller 401 lower power consumption without impacting performance. This fine-grained control can reduce the overall power consumption in datacenters and other large installations. By reducing power on a component level, the operation of the deaggregated computing systems in large datacenters can be configured to dissipate less waste heat and reduce the amount of infrastructure like cooling capacity and improve overall operation of the datacenter.

4.0. Functional Overview

Figure 10:
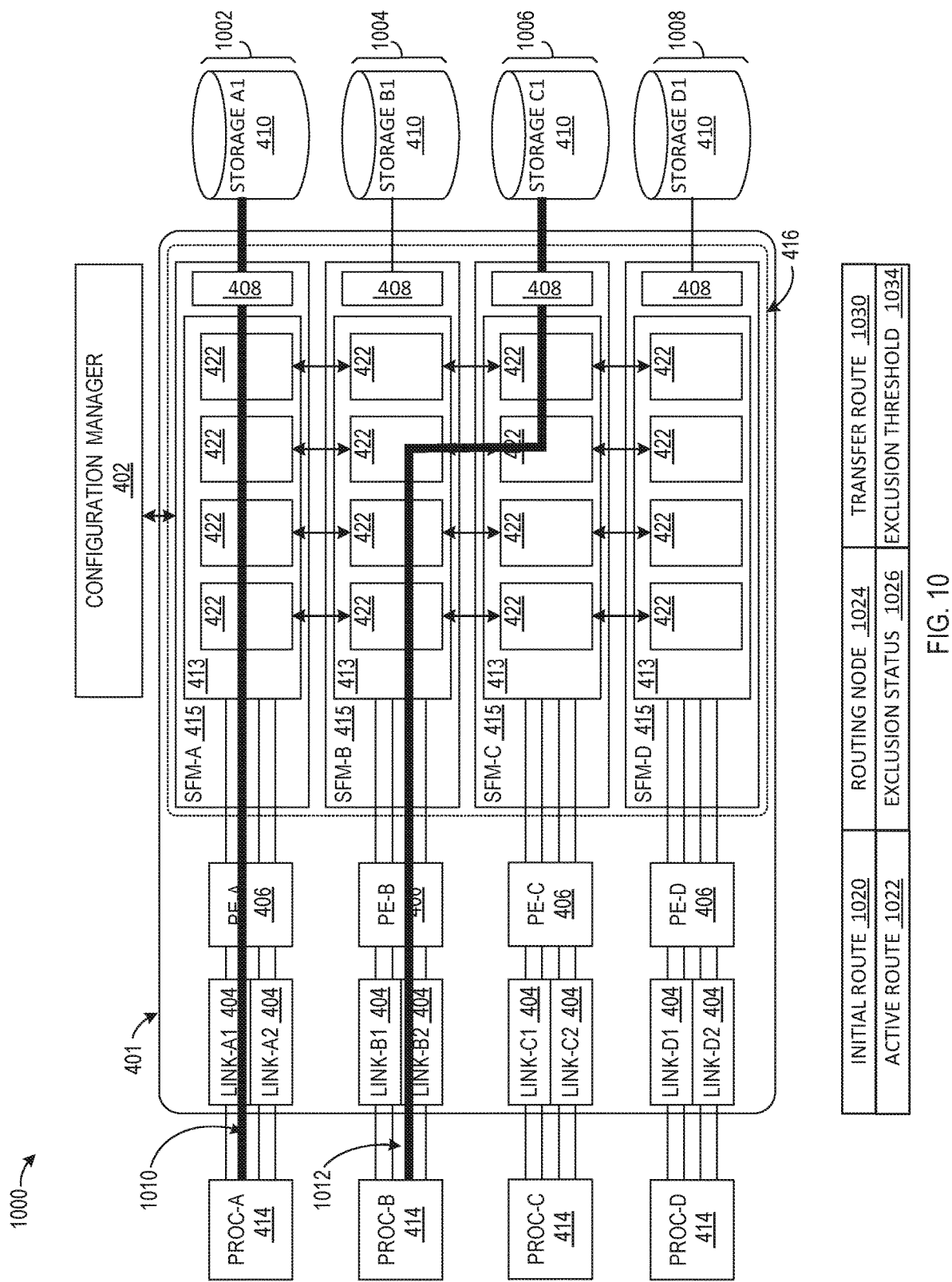
FIG. 10 depicts an example of a deaggregated computing system in a power management embodiment.

FIG. 10 illustrates an example of a deaggregated computing system 1000 in a power management embodiment. The deaggregated computing system 1000 can include the MCC storage controller 401 having one or more element rows for routing packets between the processor units 414 and the storage devices 410. The various elements and components of the system can be put into power savings modes either based on the operating conditions of the system or by the configuration manager 402.

The deaggregated computing system 1000 can have a variety of configurations. In an illustrative example, the deaggregated computing system 1000 can include the memory centric computing storage controller 401 implementing the device fabric 416 having four of the element rows 403. The element rows 403 can include an element row A 1002, an element row B 1004, and element row C 1006, and an element row D 1008. The element rows 403 can include the storage fabric module 415, the protocol engine 406, the media controller 408, the link interfaces 404 with the communication links 418, the fabric controllers 413, and the fabric interfaces 422.

In one configuration, the element row A 1002 can include a link interface A1 and a link interface A2 between the processor A and a protocol engine A and further coupled to a storage fabric module A. Although only two link interfaces are show, it is understood that other configurations are possible and there may be more or fewer of the link interfaces connected to the protocol engine A. Similarly, the element row B 1004, element row C 1006, and element row D 1008 can include two of the link interface (e.g. B 1, B2, C1, C2, D1, and D2), the protocol engine (e.g. PE A, PE B, PE-C, and PE-D), and the storage fabric module (e.g. SFM B, SFM C, and SFM-D), respectively.

Each of the element rows 403 can be coupled to one or more of the processor units 414 such as the processor unit A, a processor unit B, a processor unit C, and a processor unit D. Although the processor units 414 are shown as individual units, it is understood that there can be one or more of the processor units 414 at each location.

Similarly, the deaggregated computing system 1000 can include memory and storage devices. The storage devices 410 can include a storage device A, a storage device B, a storage device C, and a storage device D. Although the memory and storage devices are shown as individual units, it is understood that any number of such devices can be implemented.

In a first operational scenario, the deaggregated computing system 1000 can include the processor unit A performing a store operation to the storage device A1. The processor unit A can send the data packet 446 along a first fabric path 1010. The first fabric path 1010 can include using the link interface A1, the protocol engine A, and the storage fabric module A. the first fabric path 1010 is the route across the The first fabric path 1010 can be part of a transfer route 1030. The routes, such as an initial route 1020 or an active route 1022, can include routing nodes 1024. The routing nodes 1024 are the set of components along the route. For example, the routing nodes 1024 can include one or more of the storage fabric modules 415, the fabric interfaces 422, the link interfaces 404, or other system components.

The transfer route 1030 is the set of components that can be used to transfer a set of data. The initial route 1020 is a preliminary route that can be updated and then used as the transfer route 1030. The active route 1022 is the current version of the transfer route 1030. Because the transfer route 1030 can be dynamically recalculated, the active route 1022 can represent different version of the transfer route 1030 at different times.

The transfer route 1030 can be recalculated from an earlier version or from the initial route 1020 by adding one or more of the routing nodes 1024 or by excluding one or more of the routing nodes 1024. For example, if one of the nodes in the transfer route 1030 triggers allow power mode, then an exclusion status 1026 for that node can be set to a value that represent the low power mode. If the exclusion status 1026 is below an exclusion threshold 1034, then the transfer route 1030 can exclude that node and use a different node in the transfer route 1030.

The exclusion threshold 1034 can be a value that indicates that the particular node involved should not be used. The exclusion threshold 1034 can be a predefined value, a dynamically calculated value, a weighted value, a component specific value, or a combination thereof. The exclusion threshold 1034 can be a scaler value, a data object, a vector, an array of values, or a similar type of data.

Under these circumstances, the power management unit 420 of the link interface A2 could detect that it is unused and that there is no traffic in transit over the link interface A2 and deactivate the link interface A2 by cutting power to a portion of the link interface A2 or switching to a lower power mode. Deactivating the link interface A2 can reduce overall power consumption and the thermal profile of the deaggregated computing system 1000.

The power management unit 420 of the link interface A2 can monitor the incoming traffic on the communication link A2 and reactivate the link interface A2 when the target activity 460 is detected. The target activity 460 can be an event such as detecting traffic or a request for traffic that is addressed for the candidate component.

In a second operational scenario, the deaggregated computing system 1000 can include the processor unit B performing a load operation from the storage unit C1. The storage unit C1 can receive a control packet from the processor unit B and send the data packets from the storage unit C1 to the processor unit B over the second fabric path 1012. The second fabric path 1012 can include using the link interface B 1, the link interface B2, the protocol engine B, the storage fabric module B, and the storage fabric module C. The second fabric path 1012 can be part of the transfer route 1030.

The configuration manager 402 can detect that the element row D 1008 is not being used and send instructions to the power management units 420 of components of the element row D 1008 to enable the power savings mode to reduce the power consumption of the components of the element row D 1008. The power savings mode can deactivate the components or change the operating parameters of the components to use less power. The instructions can include sending a control packet from the configuration manager to the power unit of the candidate component.

The configuration manager 402 can also detect that one of the fabric interfaces 422 in the storage fabric module 415 of element row B is not being used and send instruction to the power management unit 420 of the storage fabric module 415 to enable the power savings mode or disable the fabric interface 422. This can provide a fine-grained power savings methodology to reduce power consumption by reducing power consumed by redundant units or duplicate units. The configuration manager 402 can implement the power savings by specifically configuring only some of the fabric interfaces 422 to be used to transfer information between the processor units 414 and the storage devices 410.

For example, the power savings mode can be instructions to reduce the clock frequency used to operate the components. In another example, the power savings mode can be instructions to deactivate the link interface D1 or the link interface D2 to reduced power. In yet another example, the power savings mode can be instructions to switch to a predefined behavior to reduce power. This can include performing some internal activities less often, lowering operational voltage or current levels, ceasing operation for a predefined period of time, or similar actions.

The configuration manager 402 can also detect that a portion of one of the element rows is not being used and can include the candidate components suitable that can be enabled for the power savings mode. For example, the configuration manager 402 can detect that the link interface c1, the link interface c2, and the protocol engine C of the element row C 1006 are not being utilized, although the storage fabric module C is being used to route the control and data packets along the second fabric path 1012. In this case, the configuration manager 402 can send the power packets 432 with the power command 434 and the power parameter 436 to deactivate those candidate components.

After setting the power savings mode, the deaggregated computing system 1000 can reactivate the candidate components 462 or restore power in a variety of ways. The candidate component 462 can be reactivated based on the detection of the target activity 460 associated with the candidate component, on receiving a command from the configuration manager 402, on receiving a packet from one of the processor units, based on a timer, or a combination thereof.

For example, in the first operational scenario using the first fabric path 1010, the link interface A2 is disabled, but the power management unit 420 of the link interface A2 can detect the target activity 460, such as an incoming packet from the processor unit A, and restore the power to the link interface A2. The incoming packet can represent the target activity for the candidate component 462 of the link interface A2.

The power management unit 420 can be powered on even while the rest of the link interface A2 is powered off. The power management unit 420 can be configured to monitor a receiver unit (not shown) to detect the incoming traffic. The processor unit A can try to send a packet to the link interface A2 where it can be detected and the power management unit 420 can reenable the link interface A2 before proceeding. While the power is being restored to the link interface, the processor unit A can receive a transmission failed error, enter a wait state, perform a retransmission of the packet, or use other similar delay techniques until the link interface A2 is ready to receive data.

Alternatively, the power management unit 420 can detect control signals or a predecessor wake up packet (not shown) from the processor unit A or the configuration manager 402 indicating that the target activity 460 is coming. In some configurations, there may be additional data buffers in place to allow sufficient response time for the power management unit 420 to enable the candidate component 462.

In another embodiment, the power management unit 420 of the candidate component can receive a wake-up message from a neighboring power management unit 420 of another component that is being reactivated. Thus, the system can cascade a wake-up command instruction along one or more of the element rows 403. This can be the case when a large operation is being executed and the power management units 420 can propagate a power command 434 to reactivate the MCC storage controller 401.

Figure 11:
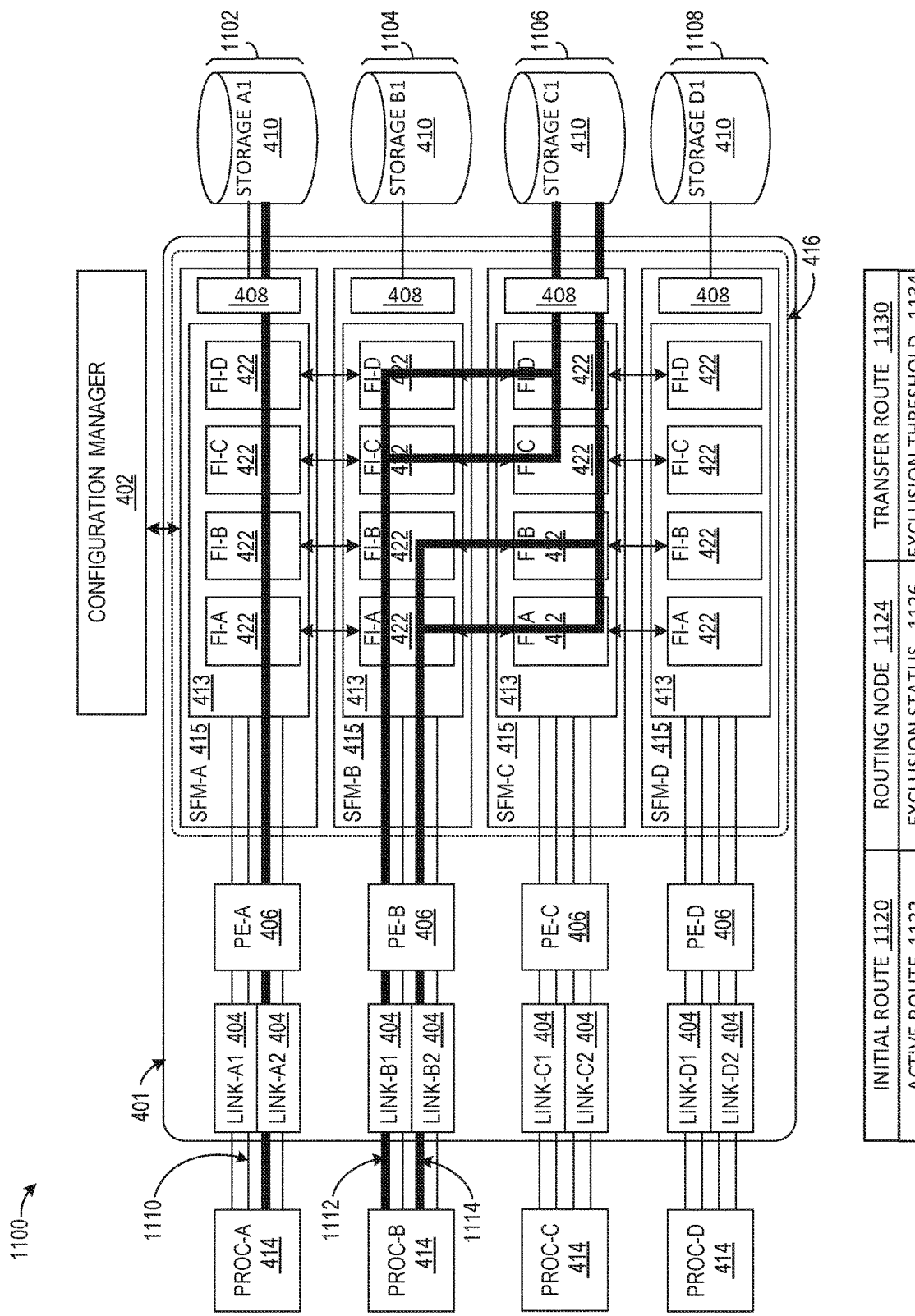
FIG. 11 depicts an example of a deaggregated computing system in a first routing embodiment.

FIG. 11 illustrates an example of a deaggregated computing system 1100 in a first routing embodiment. The deaggregated computing system 1100 can include the device fabric 416 having one or more element rows for routing packets between the processor units 414 and the storage devices 410.

The deaggregated computing system 1100 can have a variety of configurations. In an illustrative example, the deaggregated computing system 1100 can include the device fabric 416 having four of the element rows 403 such as an element row A 1102, an element row B 1104, and element row C 1106, and an element row D 1108. The element rows 403 can include the storage fabric module 415, the protocol engine 406, the link interfaces 404 with the communication links 418, the fabric controllers 413, and the fabric interfaces 422.

Although the storage fabric module 415 is shown with four of the fabric interfaces 422, it is understood that other configurations are possible. The storage fabric module 415 can have more or fewer of the fabric interfaces 422. The fabric interfaces 422 of one of the element rows can be coupled to the fabric interfaces 422 of another of the element rows located above, below, or adjacent to the one of the element rows.

In one configuration, the element row A 1102 can include a link interface A 1 and a link interface A2 between the processor A and a protocol engine A and further coupled to a storage fabric module A. Although only two link interfaces are shown, it is understood that other configurations are possible and there may be more or fewer of the link interfaces connected to the protocol engine A. Similarly, the element row B 1104, element row C 1106, and element row D 1108 can include can two of the link interface (e.g. B1, B2, C1, C2, D1, and D2), the protocol engine (e.g. PE A, PE B, PE-C, and PE-D), and the storage fabric module (e.g. SFM B, SFM C, and SFM-D), respectively.

Each of the element rows 403 can be coupled to one or more of the processor units 414 such as the processor unit A, a processor unit B, a processor unit C, and a processor unit D. Although the processor units 414 are shown as individual units, it is understood that there can be zero or more of the processor units 414 at each location and the system can include any number of the processor units 414.

Similarly, the deaggregated computing system 1100 can include memory and storage devices. The storage devices 410 can include a storage device A, a storage device B, a storage device C, and a storage device D. Although the memory and storage devices are shown as individual units, it is understood that any number of such devices can be implemented.

The configuration manager 402 can configure the device fabric 416 to implement alternate routing options. The device fabric 416 can be configured to transfer information between the processor units 414 and the storage devices 410 using a shortest route, the fastest route, a redundant route, a multiple destination route, a replication route, or a combination thereof.

In the shortest route case, the information can be routed through the least number of intermediate stages. This can include routing through the fewest number of the fabric interfaces 422. In the fastest route case, the information can be routed through the set of the fabric interfaces 422 resulting in the least delay.

The fastest route case can prioritize using the fabric interfaces 422 having a lowest routing delay. This can include prioritizing the selection of the fabric interfaces 422 that are unused or underutilized to take advantage of reduced network congestion. In addition, using the fabric interfaces 422 that may have higher levels of internal memory or buffer space can result in lower routing delays.

The redundant route case can include configurations where the information may be transferred to the final destination over two or more different routes. This can be done for data security, performance, or similar reasons. In one example, the route can be configured to use two or more of the fabric interfaces 422 in one of the element rows. This can effectively allow twice the transfer bandwidth between the element rows.

The multiple destination route case can include configurations where the information in one data path can be directed to two or more of the storage devices 410. This case can be used to perform data duplication, perform backup operations, or other similar operations. In one example, the route can be configured to transfer data between one of the processor units 414 and two or more of the storage devices 410. The data transferred to each of the storage devices 410 can be either the same data or different subsets of data from the processor units 414.

The replication route case can be configured to transfer information from one or more of the storage devices 410 to two or more of the processor units 414. This case can support data duplication when large data sets for being used by multiple processors. In one example, the route can be configured to route the data from one of the storage devices 410 to two or more of the processor units 414.

In a first operational scenario, the deaggregated computing system 1100 can include the processor unit A performing a load operation from the storage device A1. The load operation can be a data transfer operation to move data from one location to another location. Here, the load operation can transfer the target data from storage device A1 to processor unit A. The processor unit A can transfer the data packet 446 along a first fabric path 1110. The first fabric path 1110 can include using the link interface A2, the protocol engine A, and the storage fabric module A.

The first fabric path 1110 can be part of a transfer route 1130. The routes, such as an initial route 1120 or an active route 1122, can include routing nodes 1124. The routing nodes 1124 are the set of components along the route. For example, the routing nodes 1124 can include one or more of the storage fabric modules 415, the fabric interfaces 422, the link interfaces 404, or other system components.

The transfer route 1130 is the set of components that can be used to transfer a set of data. The initial route 1120 is a preliminary route that can be updated and then used as the transfer route 1130. The active route 1122 is the current version of the transfer route 1130. Because the transfer route 1130 can be dynamically recalculated, the active route 1122 can represent different version of the transfer route 1130 at different times.

The transfer route 1130 can be recalculated from an earlier version or from the initial route 1120 by adding one or more of the routing nodes 1124 or by excluding one or more of the routing nodes 1124. For example, if one of the nodes in the transfer route 1130 has an in-use flag set to indicate the node is being used, then an exclusion status 1126 for that node can be set to a value that represents the in-use status. If the exclusion status 1126 can be compared to an exclusion threshold 1134 and if the exclusion status has the proper value, then the transfer route 1130 can exclude that node and use a different node in the transfer route 1130.

The exclusion threshold 1134 can be a value that indicates that the particular node involved should not be used. The exclusion threshold 1134 can be a predefined value, a dynamically calculated value, a weighted value, a component specific value, or a combination thereof. The exclusion threshold 1134 can be a scaler value, a data object, a vector, an array of values, or a similar type of data.

This scenario can implement the shortest route case or fastest route case. The first fabric path 1110 can route data from processor unit A to the storage device A over the link interface A2. Within the storage fabric module 415, the first fabric path 1110 can be configured to use a fabric interface A to transfer information to the storage device A1. Using the fabric interface A can represent the shortest route case since it only requires a single hop. Alternatively, if the fabric interface A is configured to have the least delay, then this can represent the fastest route case.

In a second operational scenario, the deaggregated computing system 1100 can include the processor unit B performing the data transfer operation with the storage unit C1. The storage unit C1 can receive a control packet from the configuration manager 402 and send the data packets from the storage unit C1 to the processor unit B over a second fabric path 1112. The second fabric path 1112 can include using the link interface B1, the link interface B2, the protocol engine B, the storage fabric module B, the fabric interface C, the fabric interface D, and the storage fabric module C.

This scenario can implement the redundant route case using the fabric interfaces C and the fabric interfaces D of the element row B 1104 and the element row C 1106. The data coming from the processor unit C can enter the storage fabric module 415 along the element row B 1104 and be transferred to the element row C 1106 using both the fabric interface C and the fabric interface D of the element row B 1104 and the fabric interface C and the fabric interface D of the element row C 1106. The data can be further transferred from the fabric interface C and the fabric interface D of the element row C 1106 to the storage device C1. This scenario can use the fabric interfaces 422 to provide a redundant data route for the second fabric path 1112.

The second fabric path 1112 can distribute the data transfer across the fabric interface C and the fabric interface D in a variety of ways. For example, the data transfer can be balanced evenly with equal amounts of data passing through each of the fabric interfaces 422. Alternatively, the data transfer can be performed unevenly with more data passing through one of the fabric interfaces 422. This can be based on the current configuration and usage levels of the fabric interfaces 422 being used. The degree of data balance between the fabric interfaces 422 can be based on the amount of other data being transferred through one of the fabric interfaces, the buffer capacity of the fabric interfaces 422, the bandwidth capacity of the fabric interfaces 422, environmental factors, damage or other performance issues, or a combination thereof.

In a third operational scenario, the deaggregated computing system 1100 can include the processor unit B performing the data transfer operation with the storage unit C1 using both the second fabric path 1112 and a third fabric path 1114. The storage unit C1 can receive a control packet from the configuration manager 402 and send the data packets from the storage unit C1 to the processor unit B over the second fabric path 1112. The second fabric path 1112 and the third fabric path 1114 can be configured to both transfer data between the processor unit B and the storage device C.

The fabric paths and routing through the system can be determined in a variety of ways. For example, the system can calculate an initial route 1120 and then update the initial route 1120 based on current conditions. The current conditions can include power status, traffic congestions, nodes in use, and similar conditions.

In an illustrative example, the second fabric path 1112 can be an initial route 1120 and the third fabric path 1114 can be added to the initial route 1120 to update the initial route 1120. The initial route 1120 can be updated to become an active route 1122. The active route 1122 is a route in active use for transferring data. The active route 1122 can be dynamically updated during the transfer process.

The routes, such as the initial route 1120 or the active route 1122, can include routing nodes 1124. The routing nodes 1124 are the set of components along the route. For example, the routing nodes 1124 can include one or more of the storage fabric modules 415, the fabric interfaces 422, the link interfaces 404, or other system components.

The second fabric path 1112 can transfer the data from the processor unit B using the link interface B1 and the fabric interface C and the fabric interface D of the element row B 1104. The third fabric path 1114 can transfer the data from the processor unit B using the link interface B2 and the fabric interface A and the fabric interface B of the element row B 1104. The third fabric path 1114 can include using the link interface B2, the protocol engine B, the storage fabric module B, the fabric interface A, the fabric interface B, the storage fabric module B, and the storage fabric module C.

The third operational scenario can use the two or more individual fabric paths to improve bandwidth performance by using multiple link interfaces and multiple fabric interfaces to transfer data. Although this embodiment shows two fabric paths, it is understood that any number of paths may be combined.

The individual fabric paths can be dynamically reconfigured by the configuration manager 402 when different levels of performance are required. The fabric paths can be updated to avoid congestion by routing away from such bottlenecks.

In an example, the configuration manager 402 can update the definition of one of the fabric paths to change the routing. The fabric path can be updated in a variety of ways. The fabric path can be updated by sending a command packet to each of the fabric interfaces 422 to indicate how each fabric interface 422 should route the packets of the fabric path. Alternatively, the configuration manager 402 can send a command packet to the processor unit 414 to update the fabric path definition used to send packets from the processor unit 414 to the storage device 410. In addition, other mechanism for updating the routing of data over the fabric path can be employed.

In another example, the configuration manager 402 can configure the fabric paths to have different bandwidth levels. One of the fabric paths can operate at fifty percent of available bandwidth while a second of the fabric paths can operate at ten percent of the available bandwidth. This can provide fine-grained control over the overall bandwidth and also take advantage of heterogenous environments where different fabric controllers can have different inherent or available performance levels. The configuration manager 402 can send routing information to the fabric controllers 413 and the fabric interfaces 422 to adjust the performance levels individually.

Figure 12:
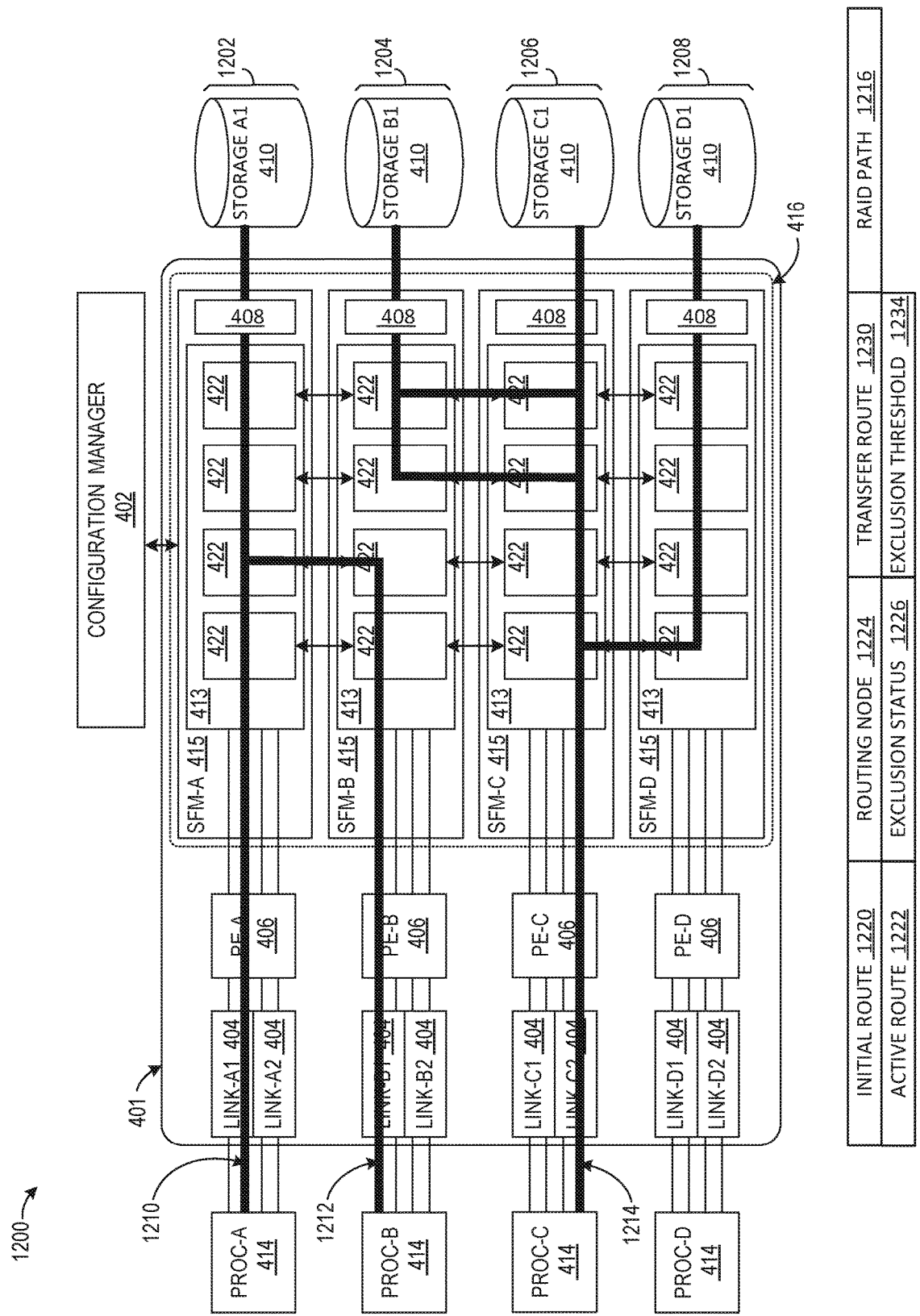
FIG. 12 depicts an example of a deaggregated computing system in a second routing embodiment.

FIG. 12 illustrates an example of a deaggregated computing system 1200 in a second routing embodiment. The deaggregated computing system 1200 can include the device fabric 416 having one or more element rows for routing packets between the processor units 414 and the storage devices 410.

The deaggregated computing system 1200 can have a variety of configurations. For example, the deaggregated computing system 1200 can have a similar configuration as that described in FIGS. 10 and 11.

In an illustrative example, the deaggregated computing system 1200 can include the device fabric 416 having four of the element rows 403 such as an element row A 1202, an element row B 1204, and element row C 1206, and an element row D 1208. The element rows 403 can include the storage fabric module 415, the protocol engine 406, the media controller 408, the link interfaces 404 with the communication links 418, the fabric controllers 413, and the fabric interfaces 422.

The configuration manager 402 can configure the device fabric 416 to implement alternate routing options. The device fabric 416 can be configured to transfer information between the processor units 414 and the storage devices 410 using the shortest route, the fastest route, the redundant route, the multiple destination route, the replication route, or a combination thereof. The shortest route, the fastest route, and the redundant route have been shown in the section describing FIG. 11.

The multiple destination route case can include configurations where the information in one data path can be directed to two or more of the storage devices 410. This case can be used to implement RAID architectures, perform data duplication, perform backup operations, or other similar operations. In one example, the route can be configured to transfer data between one of the processor units 414 and two or more of the storage devices 410. The data transferred to each of the storage devices 410 can be either the same data or different subsets of data from the processor units 414.

The replication route case can be configured to transfer information from one or more of the storage devices 410 to two or more of the processor units 414. This case can support data duplication when large data sets for being used by multiple processors. In one example, the route can be configured to route the data from one of the storage devices 410 to two or more of the processor units 414.

In a first operational scenario, the deaggregated computing system 1200 can include the storage device A transferring data to both the processor unit A and processor unit B. The storage device A can send the data packet 446 along a replication fabric path 1210 to both processor units 414. The replication fabric path 1210 can include using the link interface A2, the link interface B 1, the protocol engine A, the protocol engine B, the storage fabric module A, and the storage fabric module B.

The replication case can use the replication fabric path 1210 to show how the data from the storage device A can be duplicated and directed to both the processor unit A and the processor unit B. The storage fabric module A and the storage fabric module B can both receive copies of the data transferred from the storage device A without having the send the data twice. This can increase data transfer performance by using the storage fabric module A and the storage fabric module B to replicate the data in transit.

The replication fabric path 1210 can route data from storage device A to the processor unit A and the processor unit B via the storage fabric module A and B. The storage fabric module 415 can forward the data to the processor unit A and duplicate the data using the fabric interface 422 to route the duplicate data stream to the storage fabric module B. The data can then be transferred to the processor unit B over the link interface B1. A replication branch fabric path 1212 can be used to transfer data from the storage fabric module A to the storage fabric module B and the processor B.

Although the replication fabric path 1210 is shown duplicating the data to two of the processor units 414, it is understood that the configuration manager 402 can configure the replication fabric path 1210 to use any number of target destinations, such as any number of the processor units 414. For example, the replication fabric path 1210 can be configured to send to processor unit A, processor unit B, processor unit C, and processor unit D using the storage fabric modules A-D and the related fabric interfaces 422.

The replication fabric path 1210 can be part of a transfer route 1230. The routes, such as an initial route 1220 or an active route 1222, can include routing nodes 1224. The routing nodes 1224 are the set of components along the route. For example, the routing nodes 1224 can include one or more of the storage fabric modules 415, the fabric interfaces 422, the link interfaces 404, or other system components.

The transfer route 1230 is the set of components that can be used to transfer a set of data. The initial route 1220 is a preliminary route that can be updated and then used as the transfer route 1230. The active route 1222 is the current version of the transfer route 1230. Because the transfer route 1230 can be dynamically recalculated, the active route 1222 can represent different version of the transfer route 1230 at different times.

The transfer route 1230 can be recalculated from an earlier version or from the initial route 1220 by adding one or more of the routing nodes 1224 or by excluding one or more of the routing nodes 1224. For example, if one of the nodes in the transfer route 1230 has congestion status to indicate the node is being used for high volume traffic, then an exclusion status 1226 for that node can be set to a value that represents the usage status. If the exclusion status 1226 can be compared to an exclusion threshold 1234 and if the exclusion status 1226 has the proper value, then the transfer route 1230 can exclude that node and use a different node in the transfer route 1230.

The exclusion threshold 1234 can be a value that indicates that the particular node involved should not be used. The exclusion threshold 1234 can be a predefined value, a dynamically calculated value, a weighted value, a component specific value, or a combination thereof. The exclusion threshold 1234 can be a scaler value, a data object, a vector, an array of values, or a similar type of data.

In a second operational scenario, the deaggregated computing system 1200 can include the processor unit C performing the data transfer operation with the storage device B, storage device C, and storage device D. The processor unit C can send the data to multiple storage devices using a multiple destination route 1214. In an example, the multiple destination route 1214 can include the processor unit C, the link interface c2, the protocol engine C, the storage fabric module B-D with associated fabric interfaces 422, and the storage devices B-D.

The multiple destination case can route data from the processor unit 414 to two or more of the storage devices 410. The data can be distributed to the storage devices 410 for a variety of reasons. First, the data can be duplicated to two or more of the storage devices 410 for backup purposes, simple data duplication purposes, to utilize a redundant array of inexpensive disks (RAID) disk structure, or other similar reasons.

For backup purposes, the data from the processor unit 414 can be directed to two or more different storage devices to form a data backup of the data being transferred. In this case, the configuration manager 402 can configure the storage fabric module 415 to replicate the data and route the data to the different storage devices.

For data duplication purposes, the data can be distributed to two or more of the storage devices 410 to maintain multiple copies of a particular data object. This can be done for data performance issues, security, business reasons, or a similar reason. The storage fabric module 415 can receive the data and implement a duplicate routing to two or more of the storage devices 410.

For RAID purposes, the configuration manager 402 can configure the storage fabric modules 415 to distribute the data from the processor units 414 to two or more of the storage devices 410 based on the type of RAID implemented desired. A RAID path 1216 can be used to implement the RAID case. The RAID path 1216 can show the transfer of data from one of the processor units 414 to two or more of the storage devices 410.

The configuration manager 402, the storage fabric module 415, the fabric controller 413, the fabric interfaces 422, and the media controller 408 can be used in combination to act as a RAID controller for transferring data to multiple storage devices in both read and write operations. The system can be configured to implement different RAID types including RAID 0 for striping, RAID 1 and variations for mirroring, RAID 2 for bit striping, RAID 3 for byte striping, RAID 4 for block level striping with parity, RAID 5 for block level striping with distributed parity, and RAID 6 for block level striping with dual parity. Bit, byte, and block level striping can be enabled using the media controllers 408 that are appropriately configured.

In an example, the RAID path 1216 can route the data from the processor C to the storage device B, storage device C, and storage device D. The RAID path 1216 can also include the processor unit C, the link interface C2, the protocol engine C, the storage fabric modules B-D and their associated fabric interfaces 422 and media controllers 408.

The RAID path 1216 can route the data from the processor C to the storage fabric module C which can transfer the data to the storage device C. The storage fabric module C and then route the data to the storage device B via the storage fabric module B and the storage device D via the storage fabric module D. The RAID path 1216 can also implement a multipath configuration where two of the fabric interfaces 422 of the storage fabric module C are used to transfer data to two of the fabric interfaces 422 of the storage fabric module B.

For RAID purposes, the media controllers 408 for each of the element rows can communicate with one another to coordinate the RAID activity along the RAID path 1216. For example, the configuration manager 402 can configure the storage fabric module B, the storage fabric module C, and the storage fabric module D to operate as a single RAID controller for the storage device B, the storage device C, and the storage device D. The media controllers 408 of the storage fabric module B, the storage fabric module C, and the storage fabric module D can be configured to communicate with one another to implement data integrity, data performance, acknowledgements, and other similar functions.

The individual fabric paths can be dynamically reconfigured by the configuration manager 402 when different levels of performance are required. The fabric paths can be updated to avoid congestion by routing away from such bottlenecks. The individual fabric paths may operation in a homogenous mode with uniform performance and bandwidth, in a heterogenous mode with different performance levels and different bandwidth capacities, or in a combination thereof.

In an example, the configuration manager 402 can update the definition of one of the fabric paths to change the routing. The fabric path can be updated in a variety of ways. The fabric path can be updated by sending a command packet to each of the fabric interfaces 422 to indicate how each fabric interface 422 should route the packets of the fabric path. Alternatively, the configuration manager 402 can send a command packet to the processor unit 414 to update the fabric path definition used to send packets from the processor unit 414 to the storage device 410. In addition, other mechanism for updating the routing of data over the fabric path can be employed.

In another example, the configuration manager 402 can configure the fabric paths to have different bandwidth levels. One of the fabric paths can operate at fifty percent of available bandwidth while a second of the fabric paths can operate at ten percent of the available bandwidth. This can provide fine-grained control over the overall bandwidth and also take advantage of heterogenous environments where different fabric controllers can have different inherent or available performance levels. In the example of the RAID path 1216, the configuration manager 402 can send routing information to the fabric controllers 413 and the fabric interfaces 422 to adjust the performance levels individually such as the two fabric interfaces 422 used to transfer data between the storage fabric module B and the storage fabric module C.

Figure 13:
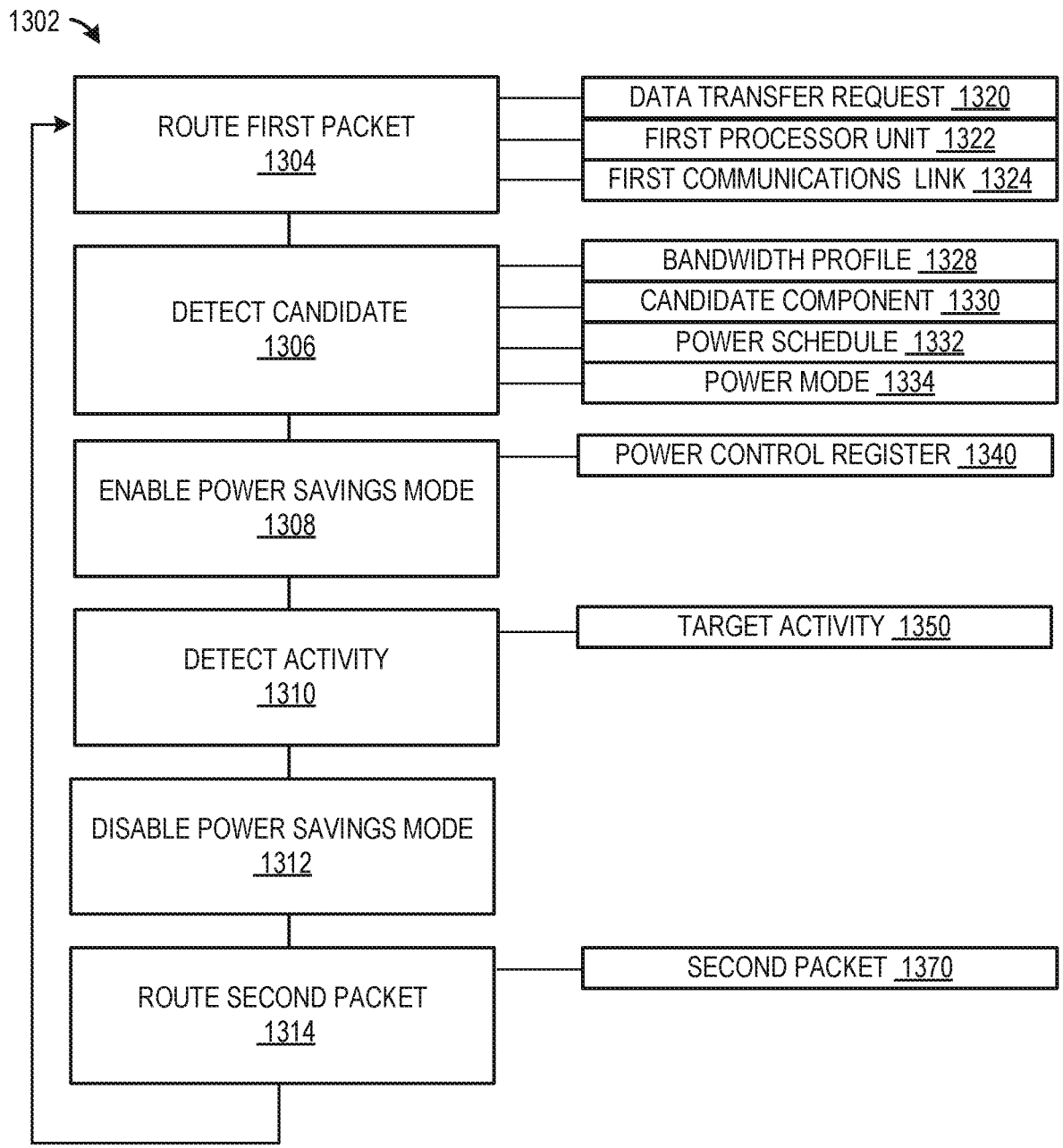
FIG. 13 depicts an example of a power management operation process flow.

FIG. 13 illustrates an example of an operating process flow 1302. The operating process flow 1302 shows the identification of a candidate component 1330 that can be configured to reduce power consumption in the deaggregated computing system 400.

The operating process flow 1302 can operation in a variety of ways. For example, the operating process flow 1302 can include the routing of data and control packets of the control protocol 438 in normal operation, the identification of a candidate power savings communication link, enabling a power savings mode on the candidate link, detecting a power on status in the system, disabling the power savings mode on the candidate link, and routing one of the protocol packets over the candidate link. The performance of the operating process flow 1302 can include the operation of the deaggregated computing system 400 for a period of time with the power savings mode enabled.

The operating process flow 1302 can include the following steps: routing a first packet in a route first packet step 1304, detecting a candidate component in a detect candidate step 1306, enabling a power savings mode in a enable power savings mode step 1308, detecting a target activity in a detect activity step 1310, disabling the power savings mode in a disable power savings mode step 1312, and routing the candidate packet over the second link in a route second packet step 1314.

In the route first packet step 1304, the MCC storage controller 401 can receive a data transfer request 1320 from a first processor unit 1322 and route one of the control or data packets over a first communication link 1324 and to one of the storage devices 410. The data transfer request 1320 can be a load operation, a store operation, or a similar data operation. However, it is understood that the routing step can be representative of any normal operation routing packets in the MCC storage controller 401.

In an example, if the data transfer request 1320 is a load data request for one of the storage devices 410, then the MCC storage controller 401 can receive the protocol packet, such as the control packet 440 on one of the external data ports 518, it can be further routed over one of the protocol engines 406, one of the data ports, one of the storage fabric modules 415, and onward to one of the storage devices 410. The MCC storage controller 401 could return the data packet 446 across the same communication link in response to the data transfer request 1320.

In the detect candidate step 1306, the MCC storage controller 401 can identify a candidate component 1330 where a potential power saving action can be initiated. The candidate component 1330 is a system device that is a part of the MCC storage controller 401 that can be controlled by one of the power management units 420 and can be deactivated or switched to a lower power operating mode. The candidate component 1330 can be one of the communication links 418, one of the storage devices 410, or another component of the deaggregated computing system 400.

Identifying the candidate component 1330 can include detecting a variety of conditions. The conditions can indicate situations where a component is not being used, has not been used for a period of time, can be switched to a lower power mode, is exceeding a power profile, may be damaged, or other similar conditions that make the components good candidates for power reduction.

For example, identifying the candidate component 1330 can be based on a bandwidth profile 1328 which can indicate how much bandwidth is required for the current configuration. If the bandwidth profile 1328 indicates that one or more of the communication links 418 is not necessary, then one of the communication links 418 can be deactivated.

In this case, the bandwidth profile 1328 can indicate that only 400 megabits per second of communication capacity is required. If each of the communication links 418 can carry 100 megabits per second, then only two of the communication links 418 are required and the other links can be deactivated. The bandwidth profile 1328 is a complex data structure that can include data about the processor units 414, the current applications, an estimate data requirement, and the available bandwidth of the communication links 418. On a larger scale, the power management unit 420 can also deactivate the link interface 404 as a single unit to reduce power in this case.

There are many variations of the bandwidth option including keeping one or more of the communication links 418 activate beyond what is currently required for the bandwidth needs. This can allow the system to respond instantly to new bandwidth needs, while allowing time to activate one or more of the deactivated communication links to handle any additional bandwidth needs. Another embodiment can keep one additional communication link active on each of the link interfaces 404 on each of the element rows 403 to handle new bandwidth and provide time to reactivate links as needed.

In another embodiment, each of the communication links 418 can be associated with one of the link timers 510 that can be triggered or reset each time the communication links 418 sent or receive traffic. In this case, when one of the link timers 510 reaches the activity threshold 522, the power management unit 420 associated with the communication links 418 can indicate that the communication links 418 is a candidate for being deactivated.

In yet another embodiment, the MCC storage controller 401 can maintain a power schedule 1332 that can deactivate components on a time scheduled basis. For example, the power schedule 1332 can include an entry to disable some of the link interfaces 404 during evening hours when predicted use may be lower.

In still another embodiment, the MCC storage controller 401 can detect when the storage devices 410 are power saving candidates based on the data stored on the device. For example, an empty or unused device may be identified as the candidate component 1330. In another example, the purpose of a storage device, such as being designated a backup device, may be used to identify the candidate component 1330.

The candidate component 1330 can be operationally identified in a variety of ways. For example, the configuration manager 402 can detect the candidate component 1330 using a power management process that can communicate with the power management units 420 associated with different components in the deaggregated computing system 400. In another example, the power management units 420 can automatically detect the candidate component 462 and operate locally or send information about the candidate component to the configuration manager 402. In another illustrative example, the configuration manager 402 can poll each of the power management units 420 in the MCC storage controller 401 in a pre-defined order to check if one of the power management units 420 have detected a condition indicating the presence of one of the candidate components 462.

In the enable power savings mode step 1308, the candidate component 1330 can be deactivated or switched to a lower power mode of operation by the power management units 420. The power management units 420 can continue to operate even when the associated components are deactivated or in a lower power mode. The power management units 420 can have a different power configuration than the candidate component 1330 to allow operation during a power saving situation.

The power management units 420 can deactivate the candidate component 1330 in a variety of ways. For example, the power management units 420 be coupled to specialized circuitry to control the power delivered to a component. This can include power controllers, relays, transistors, switches, controllers, or other electronic elements that can stop or interrupt the flow of electrical power to portions of one of the components of the deaggregated computing system 400

The power management units 420 can deactivate the candidate component 1330 while remaining active to process further power management tasks. For example, the power management units 420 can configure a power controller on one of the link interfaces 404 to allocate power to the power management unit 420 and stop power to some of the communication links 418.

In another embodiment, the power management units 420 can switch the operation of the candidate component 1330 to a lower power mode. A power mode 1334 of the candidate component 1330 can be controlled by the power management unit 420 in a variety of ways. For example, the power management unit 420 can change the power mode 1334 by setting a power control register 1340. The power control register 1340 is a local data control element that can control the operation of the candidate component 1330. Changing the value of the power control register 1340 can change an onboard frequency of the local clock, change voltage and current levels, modify internal firmware operation, or other functions.

In yet another embodiment, the power management units 420 can receive power commands from the configuration manager 402 to execute local firmware and software routines to change the operation of the candidate component 1330. This can include lowering the clock speed of the candidate component 1330. The power management units 420 can also send command to programmatically switch to a lower functional mode, lower voltage levels, deactivate cO-processor or other sub-units, enforce computational limits, combine routing streams, reduce disk speed, lower data transfer rates, change operational algorithms, or other similar operations to reduce power consumption.

In the detect activity step 1310, the MCC storage controller 401 can detect a target activity 1350 that requires the reactivation of the candidate component 1330 or switching off the lower power mode of the candidate component 1330. The target activity 1350 is an action or condition that requires the reactivation of a component that already is in a lower power mode.

The MCC storage controller 401 can detect the target activity 1350 in a variety of ways. For example, the MCC storage controller 401 can detect the target activity 1350 when the system detects the addition of one or more processor units 414 and can reactivate any of the components that are connected to the processor units 414 that have been added. In another example, the configuration manager 402 can detect that one or more of the processor units 414 are requesting an additional allocation of system resources, such as memory or storage resources, and the configuration manager 402 can send messages to the power management units 420 to reactivate the appropriate components.

In yet another example, the power management units 420 of the link interface 404 can detect the target activity 1350 can detect incoming traffic on one of the communication links 418. This can be done where the receive logic of the link interface 404 can be active and able to detect the control signals indicating traffic. This can also be done by detecting a command message or an increase in traffic on another one of the communication links 418 attached to the link interface 404. One of the communication links 418 can receive a packet and it can tell the power management unit 420 to reactivate adjacent links.

In a storage device example, the configuration manager 402 can monitor the memory map master 702 and detect that one of the storage devices 410 has been added or scheduled for use, is scheduled for use at a later time, is a backup disk, or other similar situations.

In the disable power savings mode step 1312, the candidate component 1330 can be reactivated in preparation for normal operation. The power management unit 420 can turn the power back on for the candidate component 1330 or switch the candidate component 1330 back into a normal operational mode by changing the power mode 1334.

The power mode 1334 can be changed in a similar manner to the way it was enabled. For example, the power mode 1334 can be changed back to full power operational mode by updating the power control register 1340. In another example, the power mode 1334 can be changed by receiving the power command 434 and executing the firmware and software routines to change the operational behavior of the candidate component 1330. In yet another example, the candidate component 1330 can be reactivated by applying full power back to the candidate component 1330.

In the route second packet step 1314, the candidate component 1330 is back operating normally, so a second packet 1370 can be routed through the MCC storage controller 401. In one example, the second packet 1370 can be routed from one of the processor units 414 to one of the storage devices 410 via the candidate component 1330.

Other examples of these and other embodiments are found throughout this disclosure.

Figure 14:
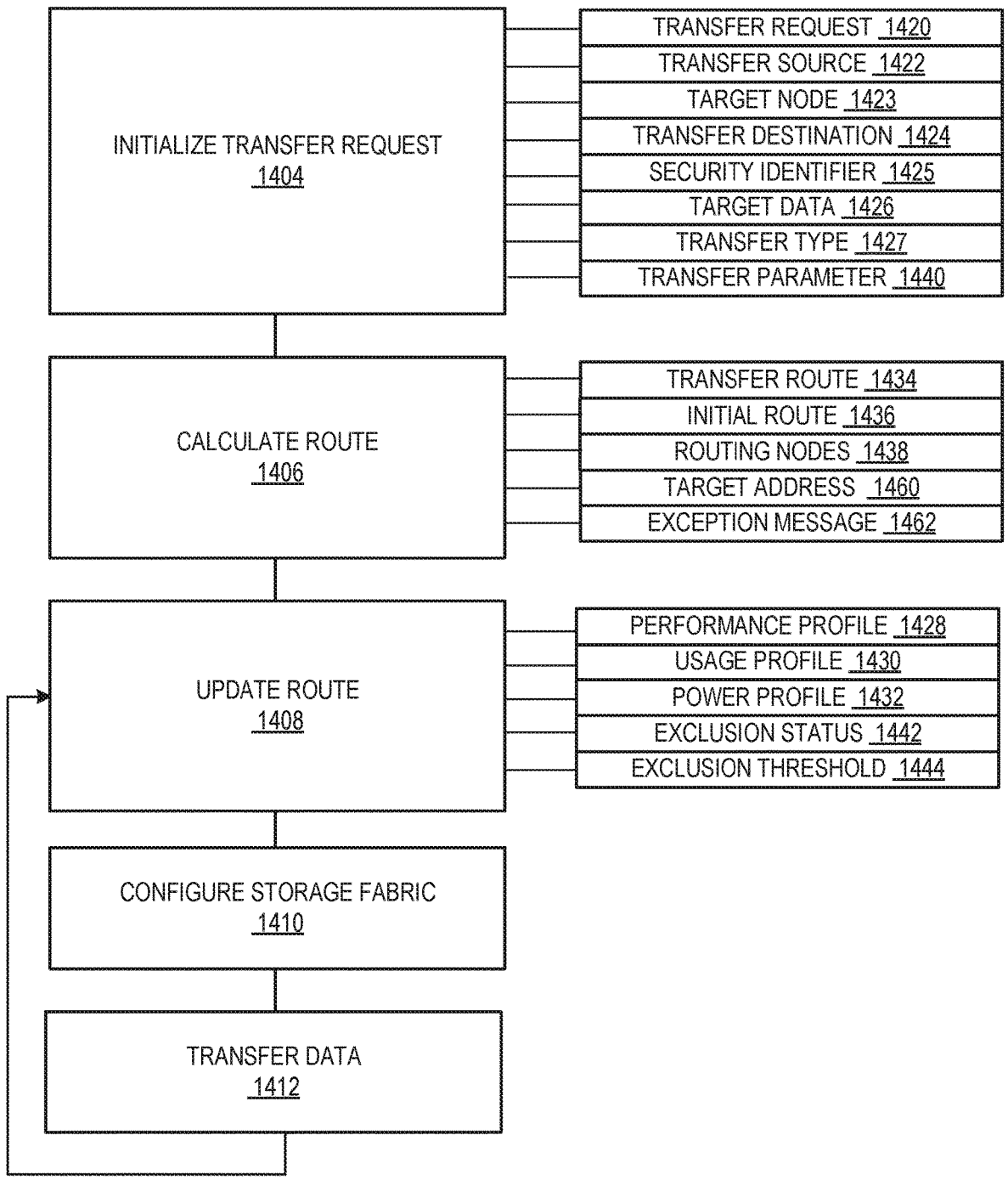
FIG. 14 depicts an example of a data transfer process flow.

FIG. 14 illustrates an example of a data transfer process flow 1402. The data transfer process flow 1402 shows the calculation of a transfer route 1434 between a transfer source 1422 and a transfer destination 1424. The transfer route 1434 can then be used to transfer data and commands between the transfer source 1422 and the transfer destination 1424.

The transfer source 1422 and the transfer destination 1424 are the end points of the data transfer operation. Because the data can flow in both directions, the transfer source 1422 and the transfer destination 1424 can be either one of the processor units 414 or one of the storage devices 410.

For example, the transfer source 1422 can be the processor unit 414 or the storage device 410 such as the processor unit A, the processor unit B, the processor unit C, the processor unit D, the storage device A, the storage device B, the storage device C, the storage device D, or a combination thereof. Similarly, the transfer destination 1424 can be also be the processor units 414, the storage devices 410, or a combination thereof.

The transfer route 1434 can describe the components used to transfer data and command between the transfer source 1422 and the transfer destination 1424. This can include the hardware interfaces and links of the memory centric computing storage controller 401. The transfer route 1434 can include the processor units 414, the communication links 418, the protocol engine 406, the storage fabric modules 415, the fabric controller 413, the fabric interfaces 422, the media controller 408, and the storage devices 410.

The data transfer process flow 1402 can operate in a variety of ways. For example, the data transfer process flow 1402 can be performed by the configuration manager 402, the processor units 414, storage fabric modules 415, the fabric controllers 413, the protocol engines 406, the fabric interfaces 422, the media controller 408, the link interfaces 404, or a combination thereof.

In an illustrative example, the configuration manager 402 can receive a transfer request 1420 with the target data 1426. The configuration manager 402 can calculate the initial route 1020 based on the transfer type 1427. The transfer route 1434 can be assigned to the initial route 1020 calculated between the transfer source 1422 and the transfer destination 1424. The configuration manager 402 can then update the transfer route 1434 based on the current conditions and the initial route 1020. The transfer route 1434 can also be the active route 1022.

The current conditions can include the presence of the reservation, such as a mutex 712, for a target address 1460 in the target data 1426. The coherency manager 708 can maintain the memory map master 702 having the list of the reservations for the target addresses 1460 currently in use by the data transfer operation. The coherency manager 708 can update the memory map cache 602 in the protocol engines 406.

The transfer route 1434 can be updated dynamically before and during the actual transfer of data. For example, the transfer route 1434 can be recalculated to exclude a target node 1423 from the route. The target node 1423 can be any one of the routing nodes 1024 in the transfer route 1434 having an exclusion status 1442.

The data transfer process flow 1402 can handle the presence of the mutex 712 indicating the reservation on an address in a variety of ways. The data transfer process flow 1402 can be suspended until the mutex 712 has been released. Alternatively, the data transfer process flow 1402 can continue and the target address 1460 associated with the mutex 712 can be transferred once the mutex 712 has been released. In yet another case, the data transfer process flow 1402 can be cancelled. In each case, an exception message 1462 can be generated to show the result and status. The exception message 1462 can include a success or failure status as well as an identifier for the mutex 712 and the target address 1460.

The data transfer process flow 1402 can be configured in a variety of ways. For example, the data transfer process flow 1402 can include the following steps: an initialize transfer request step 1404, a calculate route step 1406, an update route step 1408, a configure storage fabric step 1410, and a transfer data step 1412.

In the initialize transfer request step 1404, the data transfer operation across the memory centric computing storage controller 401 can be initiated by the creation of a transfer request 1420. The transfer request 1420 can be initiated by one of the processor units 414 requesting the transfer of data between one or more of the storage devices 410.

The transfer request 1420 is a data structure describing the data transfer to be performed. The transfer request 1420 can include at least the transfer source 1422, the transfer destination 1424, a security identifier 1425, a transfer type 1427, a transfer parameter 1440, and the target data 1426.

The transfer request 1420 can indicate that the data or command should be transferred from the transfer source 1422 to the transfer destination 1424. The transfer source 1422 and the transfer destination 1424 can be data structures describing one or more of the processor units or storage devices.

The transfer request 1420 can include the security identifier 1425. The security identifier 1425 is a data structure indicating what type of access the transfer request 1420 is allowed. The security identifier 1425 can have a variety of configurations. For example, the security identifier 1425 can be a user identifier, an access control list identifier, a group identifier, a data-specific identifier, a device level identifier, or similar entity defining a security access permission for a subset of data within the system.

The transfer request 1420 can include the transfer type 1427 describing the type of transfer to be performed. The transfer type 1427 can include information indicating data transfers, command information transfers, or routing type such as shortest route, fastest route, redundant route, multiple destination route, replication route, or other similar routing information.

The transfer request 1420 can include the transfer parameter 1440 that provides information about how the data transfer operation should be performed. This can include preferred routing information, performance parameters, data quality parameters, transfer block or unit sizes, priority, security identifiers, or other similar parameters.

The transfer request 1420 can be received by the configuration manager 402 and used to configure the MCC storage controller 401 to perform the transfer. The configuration manager 402 can validate the transfer request 1420 to ensure that the request can be performed.

The configuration manager 402 can validate that the transfer request 1420 in a variety of ways. The configuration manager 402 can use the security manager 704 to compare the security identifier 1425 to an existing security database (not shown) having a list of data objects and their associated security permissions. If the security identifier 1425 of the transfer request 1420 matches a permissive entry in the security database, then the transfer can be allowed. If the security identifier 1425 of the transfer request 1420 does not match a permissive entry in the security database, then the transfer request 1420 can be rejected.

Once the transfer request 1420 has been processed by the configuration manager 402, the control flow can pass to the calculate route step 1406. The configuration manager 402 can calculate the transfer route 1434 in the calculate route step 1406.

In an alternate embodiment, the functionality of the configuration manager 402 can be performed or supplemented by one or more of the processor units 414. It is understood that references to the configuration manager 402 include the functionality of the configuration manager 402 when performed by alternative structures.

In the calculate route step 1406, an initial route 1436 can be calculated. The initial route 1436 is the set of routing components between the source and the destination and includes the transfer source 1422, the link interfaces 404, the protocol engine 406, the storage fabric module 415, the fabric controller 413, the fabric interfaces 422, the media controller 408, and the transfer destination 1424. The initial route 1436 can be based on the transfer type 1427. The initial route 1436 can be assigned as the transfer route 1434 for the data transfer operation.

In one embodiment, the configuration manager 402 can calculate the initial route 1436 between the transfer source 1422 and the transfer destination 1424. The configuration manager 402 can calculate the transfer route 1434 based on the transfer type 1427. The transfer type 1427 can include a description of the type of routing operation to be performed. This can include the shortest route, the fastest route, the redundant route, the multiple destination route, the replication route, or other similar routing type.

The configuration manager 402 can modify routing based on environmental data. The environmental data can include information about components that are in a power savings mode, components that are currently being used by other data transfer operations, known hotspots, or other performance issues that may affect the ability of one of the components to perform appropriately.

For example, the configuration manager 402 can detect that one of the fabric interfaces 422 is in use and may select a different one of the fabric interfaces 422 in one of the storage fabric modules 415 to avoid the potential data traffic bottleneck. In this case, the device database of the configuration manager 402 can include the device identifier 722 of the fabric interface 422 and the performance metric 724 that indicates that the fabric interface 422 has a lower performance metric 724 because it is being used by another transfer route. The configuration manager 402 can compare the performance metric 724 against a pre-defined value or the performance metric 724 of another one of the fabric interfaces 422 to determine whether to use that particular one of the fabric interfaces 422 in the transfer route 1434.

In another example, the configuration manager 402 can detect that one of the storage fabric modules 415 has a performance problem and is shown in the device database 720 to have a lower performance metric 724. The configuration manager 402 can update the initial route to select a different one of the storage fabric modules 415 to avoid potential performance issues across all of the fabric interfaces 422 of the storage fabric module 415.

In yet another example, the configuration manager 402 can detected that one of the link interfaces 404 coupled to one of the processor units 414 is operating in a power savings mode and not available to run at full speed. The configuration manager 402 can select another one of the link interfaces 404 coupled to the processor unit 414 to avoid the link interface 404 in the power savings mode.

The transfer route 1434 can be updated dynamically during operation. One of the components along the transfer route 1434 can detect a problem and request a recalculation of the transfer route 1434. The problems can include data congestion, component failure or degradation, cache problems, coherency problems, buffering issues, or other similar issues.

The recalculation of the transfer route 1434 can be done at a global level by the configuration manager 402 or locally at the component level. The recalculation of the transfer route 1434 can also be initiated by the originator of the transfer request 1420.

At the global level, the configuration manager 402 can detect the problem or receive a problem notification from one of the system components and initiate a recalculation of the transfer route 1434. The configuration manager 402 can then update the system with the new information about the transfer route 1434.

At the local level, a component can detect the problem and update the routing information as appropriate. This can allow the component to route the data through sub-components that have available capacity.

For example, if one of the storage fabric modules 415 along the transfer route 1434 detects that one of the fabric interfaces 422 is generating errors, then the storage fabric module 415 can switch to another one of the fabric interfaces 422 that is available.

The configuration manager 402 can also perform a global optimization on the transfer route 1434 after updating the initial route based on power and performance issues. The configuration manager 402 can equalize overall system data transfer performance across all of the storage fabric modules 415, the fabric controllers 413, and the fabric interfaces 422. If necessary, the configuration manager 402 can optimize the transfer route 1434 by updating the transfer type 1427 to switch from a single path to a multiple path route.

When calculating the transfer route 1434, the configuration manager 402 can select a component that is currently in a power savings mode and configure the component to operate in a normal or full power mode. The configuration manager 402 can communicate with the power management unit 420 of the selected component and send a message or packet to bring the component out of the power savings mode. This can include switching the component to full power mode, resetting the performance levels of the component, sending a power packet 432 to the component, or other similar activities. For example, the configuration manager 402 can send a command to the component in the power savings mode telling the component to reactivate.

When the transfer route 1434 has been calculated, the control flow can pass to the update route step 1408. The update route step 1408 can dynamically update the routing nodes 1438 selected in the transfer route 1434.

In the update route step 1408, the transfer route 1434 can be updated by adding nodes or excluding nodes from the transfer route 1434. Each node can be subject to different conditions that can lead to excluding or adding the node.

In an illustrative example, one of the routing nodes 1438 of the transfer route 1434 can have a performance profile 1428 indicating that the routing node 1438 has a level of performance that indicates that the node should not be used. The performance profile 1428 can have a variety of configurations. For example, the performance profile 1428 can be a data object indicating the bandwidth or network capacity of the node. If the performance profile 1428 is less than or equal to an exclusion threshold 1444, such as a performance threshold, then the node can be excluded from the transfer route 1434. This can be done to compensate for node that are suffering from degradation, damage, or other performance problems. After the node has been excluded, the transfer route 1434 can be recalculated and other nodes used to route around the excluded node.

In another example, one of the routing nodes 1438 can have a usage profile 1430 indicating if the node is currently in-use for another operation. The usage profile 1430 can be a data structure that indicate the one of the routing nodes 1438 is currently being used. If so, then the exclusion status 1442 can be set to exclude the node.

In yet another example, one of the routing nodes 1438 can have a power profile 1432 indicate the power status 728 of the node. If the power profile 1432 indicates that the power status 728 of the node is less than or equal to the exclusion threshold 1444, such as the power threshold 734, then the exclusion status 1442 can be set to exclude the node.

The update route step 1408 can add new nodes to the transfer route 1434. The new nodes can be added to replace an excluded node, to add new node to route around an excluded node, to add an additional set of routing nodes for performance or functional reasons, or a combination thereof.

For example, if one of the routing nodes 1438 is excluded, then a replacement node can be selected and added to the transfer route 1434. In this case, if one of the fabric interfaces 422 reaches a level of performance such that the performance profile 1428 indicates is too low, then another of the fabric interfaces 422 of the fabric controller 413 can be added to the transfer route 1434 and the data can be routed through that node.

The update route step 1408 can be repeated as needed during the data transfer process. The update route step 1408 can form the transfer route 1434 of different lengths by adding and excluding the routing nodes 1438 to form the path between the transfer source 1422 and the transfer destination 1424.

In the configure storage fabric step 1410, the configuration manager 402 can configure the components of the device fabric 416 to transfer the data along the transfer route 1434. The configuration manager 402 can communicate with the components to control the flow of data.

The configuration manager 402 can configure the device fabric 416 in a variety of ways. In one embodiment, the configuration manager 402 can send one or more of the control packets to one or more components along the transfer route 1434 to define the current route and to indicate where the next component is in the route. Each component, such as the storage fabric module 415 or the fabric interfaces 422, can have the information about where to receive and where to send the information associated with the transfer route 1434.

In another embodiment, the configuration manager 402 can configure the processor unit 414 to transfer the data associated with the transfer using a header identifying the transfer route 1434. Each packet of the data transfer can include the routing information to facilitate the routing of the data.

In the transfer data step 1412, the data can be transferred along the transfer route 1434 between the transfer source 1422 and the transfer destination 1424. The transfer source 1422, such as the processor unit 414 or the storage device 410, can send the data into the memory centric computing storage controller 401 along the transfer route 1434. The memory centric computing storage controller 401 can transfer the data from one component to the next along the transfer route 1434.

The MCC storage controller 401 can transfer the data in a variety of ways. For example, the MCC storage controller 401 can transfer the data in the data packets 446. The MCC storage controller 401 can provide flow control support to ensure the routing and delivery of the data packets 446 from the transfer source 1422 to the transfer destination 1424. The MCC storage controller 401 can include memory buffers to control the flow of data between components. The MCC storage controller 401 can employ control messages to coordinate the transfer of the data.

The MCC storage controller 401 can use the coherency manager 708 to manage and update the memory map during the time require to transfer the data. The coherency manager 708 can flag a portion of the memory area of the storage devices 410 as being locked because it is being updated. Once the update is complete, the coherency manager 708 can indicate the portion of the memory area is updated and available.

In another embodiment, the transfer route 1434 can be generated dynamically and updated along the route by the components. In this case, the transfer request 1420 can be instantiated by one of the processor units 414. The processor unit 414 can select the link interface 404 based on local data such as usage or bandwidth data and then send the transfer request 1420 to the protocol engine 406.

The protocol engine 406 can calculate the transfer route 1434 to the transfer destination 1424 based on the information in the memory map cache 602. The memory map cache 602 can include routing information from the memory map master 702. If the memory map cache 602 does not have the required data for calculating the transfer route 1434, the configuration manager 402 can update the memory map cache 602. Once the protocol engine 406 has determined the transfer route 1434, the target data 1426 can be transferred along the transfer route 1434.

The protocol engines 406 can send the transfer route 1434 to the fabric controllers 413 to control the transfer of the data. During the data transfer operation, the transfer route 1434 can be updated by the configuration manager 402 as needed. The configuration manager 402 can receive status information about the various components in the system.

Other examples of these and other embodiments are found throughout this disclosure.

5.0. EXAMPLE EMBODIMENTS

Examples of some embodiments are represented, without limitation, in the following clauses and use cases:

According to an embodiment, a method of operation of a memory centric computing system comprises calculating a transfer route based on a transfer request having a transfer source, a transfer destination, a transfer type, and a data target, the transfer route including one or more routing nodes between the transfer source and the transfer destination, wherein the transfer destination is a memory device, recalculating the transfer route to exclude a target node of the routing nodes having an exclusion status less than or equal to a routing threshold, detecting a reservation for a target address within an address range of the transfer destination, transferring the target data to the transfer destination along the transfer route after the reservation indicates the target address is available.

In an embodiment, the method further comprises calculating the exclusion status includes calculating the exclusion status based on a power metric of one of the routing nodes less than or equal to a power threshold.

In an embodiment, the method further comprises calculating the exclusion status includes calculating the exclusion status based on one of the routing nodes having an in-use flag indicating active use.

In an embodiment, the method further comprises calculating the exclusion status includes calculating the exclusion status based on a performance metric of one of the routing nodes less than or equal to a performance threshold.

In an embodiment, the method further comprises detecting the reservation includes detecting the reservation in a memory map cache in one of the routing nodes in the transfer route.

In an embodiment, the method further comprises transferring the target data includes transferring the target data to a processor unit, a memory unit, or a storage unit.

In an embodiment, the method further comprises recalculating the transfer route includes recalculating the transfer route dynamically while transferring the target data to the transfer destination.

According to an embodiment, a deaggregated computing system comprises a processor unit coupled to a storage device, and a memory centric computing storage controller configured to transfer target data between the processor unit and the storage device, the memory centric computing storage controller including a configuration module configured to calculate a transfer route based on a transfer request having a transfer source, a transfer destination, a transfer type, and a data target, the transfer route including one or more routing nodes between the transfer source and the transfer destination, wherein the transfer destination is a memory device, and for recalculating the transfer route to exclude a target node of the routing nodes having an exclusion status less than or equal to a routing threshold, a protocol engine configured to detect a reservation for a target address within an address range of the transfer destination, and a fabric controller configured to transfer the target data to the transfer destination along the transfer route after the reservation indicates the target address is available.

In an embodiment, the system further comprises the configuration manager is configured for calculating the exclusion status based on a power metric of one of the routing nodes less than or equal to a power threshold.

In an embodiment, the system further comprises the configuration manager is configured for calculating the exclusion status based on one of the routing nodes having an in-use flag indicating active use.

In an embodiment, the system further comprises configuration manager is configured for calculating the exclusion status based on a performance metric of one of the routing nodes less than or equal to a performance threshold.

In an embodiment, the system further comprises the protocol engine is configured for detecting the reservation in a memory map cache in one of the routing nodes in the transfer route.

In an embodiment, the system further comprises the fabric controller is configured for transferring the target data to a processor unit, a memory unit, or a storage unit.

In an embodiment, the system further comprises the configuration manager is configured for recalculating the transfer route dynamically while transferring the target data to the transfer destination.

According to an embodiment, one or more non-transitory computer-readable media storing instructions that, when executed by one or more computing devices, cause calculating a transfer route based on a transfer request having a transfer source, a transfer destination, a transfer type, and a data target, the transfer route including one or more routing nodes between the transfer source and the transfer destination, wherein the transfer destination is a memory device, recalculating the transfer route to exclude a target node of the routing nodes having an exclusion status less than or equal to a routing threshold, detecting a reservation for a target address within an address range of the transfer destination, transferring the target data to the transfer destination along the transfer route after the reservation indicates the target address is available.

In an embodiment, the non-transitory computer-readable media further comprises the instruction when executed by the one or more computing devices, further cause calculating the exclusion status based on a power metric of one of the routing nodes less than or equal to a power threshold.

In an embodiment, the non-transitory computer-readable media further comprises the instruction when executed by the one or more computing devices, further cause calculating the exclusion status based on one of the routing nodes having an in-use flag indicating active use or the exclusion status based on a performance metric of one of the routing nodes less than or equal to a performance threshold.

In an embodiment, the non-transitory computer-readable media further comprises the instruction when executed by the one or more computing devices, further cause detecting the reservation in a memory map cache in one of the routing nodes in the transfer route.

In an embodiment, the non-transitory computer-readable media further comprises the instruction when executed by the one or more computing devices, further cause transferring the target data to a processor unit, a memory unit, or a storage unit.

In an embodiment, the non-transitory computer-readable media further comprises the instruction when executed by the one or more computing devices, further cause recalculating the transfer route dynamically while transferring the target data to the transfer destination.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the drawings, the various components are depicted as being communicatively coupled to various other components by arrows. These arrows illustrate only certain examples of information flows between the components. Neither the direction of the arrows nor the lack of arrow lines between certain components should be interpreted as indicating the existence or absence of communication between the certain components themselves. Indeed, each component may feature a suitable communication interface by which the component may become communicatively coupled to other components as needed to accomplish any of the functions described herein.

In the specification, embodiments of the invention have been described with reference to numerous specific details that may vary from implementation to implementation. Thus, the sole and exclusive indicator of what is the invention and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is understood that the system functionality can be described using terms like module, unit, system, subsystem, and component that represent devices that can be implemented using different combinations of hardware, firmware, and software elements. The devices can include electric subsystems, optical subsystems, mechanical subsystems, and other physical elements. These elements can include computing elements that can execute the firmware and software of the system.

What is claimed is:

1. A method of operation of a memory centric computing system comprising:
    calculating a transfer route based on a transfer request having a transfer source, a transfer destination, a transfer type, and a data target, the transfer route including one or more routing nodes between the transfer source and the transfer destination, wherein the transfer destination is a memory device;
    recalculating the transfer route to exclude a target node of the routing nodes having an exclusion status less than or equal to a routing threshold, the exclusion status based on a power metric of one of the routing nodes less than or equal to a power threshold;
    detecting a reservation for a target address within an address range of the transfer destination; and
    transferring the target data to the transfer destination along the transfer route after the reservation indicates the target address is available.

2. The method as claimed in claim 1, wherein calculating the exclusion status includes calculating the exclusion status based on one of the routing nodes having an in-use flag indicating active use.

3. The method as claimed in claim 1, wherein calculating the exclusion status includes calculating the exclusion status based on a performance metric of one of the routing nodes less than or equal to a performance threshold.

4. The method as claimed in claim 1, wherein detecting the reservation includes detecting the reservation in a memory map cache in one of the routing nodes in the transfer route.

5. The method as claimed in claim 1, wherein transferring the target data includes transferring the target data to a processor unit, a memory unit, or a storage unit.

6. The method as claimed in claim 1, wherein recalculating the transfer route includes recalculating the transfer route dynamically while transferring the target data to the transfer destination.

7. A deaggregated computing system comprising:
    a processor unit coupled to a storage device; and
    a memory centric computing storage controller configured to transfer target data between the processor unit and the storage device, the memory centric computing storage controller including:

a configuration module configured to calculate a transfer route based on a transfer request having a transfer source, a transfer destination, a transfer type, and a data target, the transfer route including one or more routing nodes between the transfer source and the transfer destination, for recalculating the transfer route to exclude a target node of the routing nodes having an exclusion status less than or equal to a routing threshold, and calculating the exclusion status based on a power metric of one of the routing nodes less than or equal to a power threshold, and wherein the transfer destination is a memory device, a protocol engine configured to detect a reservation for a target address within an address range of the transfer destination, and a fabric controller configured to transfer the target data to the transfer destination along the transfer route after the reservation indicates the target address is available.

8. The system as claimed in claim 7, wherein the configuration manager is configured for calculating the exclusion status based on one of the routing nodes having an in-use flag indicating active use.

9. The system as claimed in claim 7, wherein configuration manager is configured for calculating the exclusion status based on a performance metric of one of the routing nodes less than or equal to a performance threshold.

10. The system as claimed in claim 7, wherein the protocol engine is configured for detecting the reservation in a memory map cache in one of the routing nodes in the transfer route.

11. The system as claimed in claim 7, wherein the fabric controller is configured for transferring the target data to a processor unit, a memory unit, or a storage unit.

12. The system as claimed in claim 7, wherein the configuration manager is configured for recalculating the transfer route dynamically while transferring the target data to the transfer destination.

13. One or more non-transitory computer-readable media storing instructions that, when executed by one or more computing devices, cause:

calculating a transfer route based on a transfer request having a transfer source, a transfer destination, a transfer type, and a data target, the transfer route including one or more routing nodes between the transfer source and the transfer destination, wherein the transfer destination is a memory device;

recalculating the transfer route to exclude a target node of the routing nodes having an exclusion status less than or equal to a routing threshold, the exclusion status based on a power metric of one of the routing nodes less than or equal to a power threshold;

detecting a reservation for a target address within an address range of the transfer destination;

transferring the target data to the transfer destination along the transfer route after the reservation indicates the target address is available.

14. The non-transitory computer-readable media of claim 13, wherein the instruction when executed by the one or more computing devices, further cause calculating the exclusion status based on one of the routing nodes having an in-use flag indicating active use or the exclusion status based on a performance metric of one of the routing nodes less than or equal to a performance threshold.

15. The non-transitory computer-readable media of claim 13, wherein the instruction when executed by the one or more computing devices, further cause detecting the reservation in a memory map cache in one of the routing nodes in the transfer route.

16. The non-transitory computer-readable media of claim 13, wherein the instruction when executed by the one or more computing devices, further cause transferring the target data to a processor unit, a memory unit, or a storage unit.

17. The non-transitory computer-readable media of claim 13, wherein the instruction when executed by the one or more computing devices, further cause recalculating the transfer route dynamically while transferring the target data to the transfer destination.

\* \* \* \* \*